US012676762B2

(12) United States Patent　　　(10) Patent No.:　US 12,676,762 B2
Davies et al.　　　　　　　　　　　(45) Date of Patent:　　Jul. 7, 2026

(54) PHYSICALLY UNCLONABLE FUNCTIONS

(71) Applicant: nChain Licensing AG, Zug (CH)

(72) Inventors: Jack Owen Davies, London (GB);
　　　　　　　 Craig Steven Wright, London (GB)

(73) Assignee: nChain Licensing AG, Zug (CH)

( * ) Notice:　Subject to any disclaimer, the term of this
　　　　　　patent is extended or adjusted under 35
　　　　　　U.S.C. 154(b) by 340 days.

(21) Appl. No.:　　18/029,078

(22) PCT Filed:　　Aug. 31, 2021

(86) PCT No.:　　PCT/EP2021/073961
　　　§ 371 (c)(1),
　　　(2) Date:　　Mar. 28, 2023

(87) PCT Pub. No.: WO2022/069132
　　　PCT Pub. Date: Apr. 7, 2022

(65) Prior Publication Data
　　　US 2024/0015033 A1　　Jan. 11, 2024

(30) Foreign Application Priority Data
　　Sep. 30, 2020　(GB) ...................................... 2015475

(51) Int. Cl.
　　*H04L 9/32*　　　　(2006.01)
　　*H04L 9/00*　　　　(2022.01)
　　　　　　　　(Continued)

(52) U.S. Cl.
　　CPC .......... *H04L 9/3278* (2013.01); *H04L 9/0866*
　　　　　　(2013.01); *H04L 9/321* (2013.01);
　　　　　　　　(Continued)

(58) Field of Classification Search
　　CPC ....... H04L 9/3278; H04L 9/50; H04L 9/0866;
　　　　　　H04L 9/321; H04L 9/3271; H04L
　　　　　　63/0876; H04L 9/32; H04L 9/00; H04L
　　　　　　　　　　　　　　　　　　　9/40
　　See application file for complete search history.

(56) References Cited

U.S. PATENT DOCUMENTS 8,699,714 B2　　4/2014　Tuyls et al.
8,868,923 B1　10/2014　Hamlet et al.
　　　　　　(Continued)

FOREIGN PATENT DOCUMENTS

CN　　108369697 A　　8/2018
CN　　109150972 A　　1/2019
　　　　　　(Continued)

OTHER PUBLICATIONS

Combined Search and Examination Report under Sections 17 and
18(3) for Application No. GB2015477.9, mailed on Mar. 26, 2021,
8 pages.

(Continued)

*Primary Examiner* — Robert B Leung
*Assistant Examiner* — Howard H. Louie
(74) *Attorney, Agent, or Firm* — Galvani Smith PLLC

(57)　　　　　　ABSTRACT

A method for enabling a verifying party to verify an identity
of a target party or device. The method comprises, in a set-up
phase: storing, in a data store, a respective piece of response
data for each of a set of one or more responses resulting from
a setting-up party inputting a respective set of one or more
challenges into a PUF module comprising a physically
unclonable function, PUF, to generate the one or more
responses based on the PUF; and storing an indication of the
set of challenges in the data store. The indication does not
comprise a value of each of the challenges in the set, but
rather a master challenge from which the set of challenges (Continued)

is derivable by applying a derivation function to the master challenge.

25 Claims, 8 Drawing Sheets

(51) Int. Cl.
 *H04L 9/08* (2006.01)
 *H04L 9/40* (2022.01)
(52) U.S. Cl.
 CPC .............. *H04L 9/3271* (2013.01); *H04L 9/50* (2022.05); *H04L 63/0876* (2013.01)

(56) References Cited

U.S. PATENT DOCUMENTS

| | | | |
|---|---|---|---|
| 10,050,785 | B2 | 8/2018 | Tuyls et al. |
| 10,250,708 | B1 | 4/2019 | Carver et al. |
| 10,256,983 | B1 | 4/2019 | Bauer et al. |
| 10,554,405 | B1 | 2/2020 | Endress et al. |
| 11,288,736 | B1 | 3/2022 | Jette et al. |
| 11,531,985 | B2 | 12/2022 | Weight et al. |
| 2002/0101988 | A1 | 8/2002 | Jones |
| 2003/0204743 | A1 | 10/2003 | Devadas et al. |
| 2007/0125857 | A1* | 6/2007 | Tuyls .................... H04L 9/3278 |
| | | | 235/454 |
| 2009/0083833 | A1 | 3/2009 | Ziola et al. |
| 2009/0282259 | A1* | 11/2009 | Skoric ................. G06Q 20/341 |
| | | | 726/20 |
| 2011/0066670 | A1* | 3/2011 | Yu ........................... G06F 7/582 |
| | | | 708/254 |
| 2012/0242459 | A1 | 9/2012 | Lambert |
| 2013/0142329 | A1 | 6/2013 | Bell et al. |
| 2015/0019441 | A1 | 1/2015 | Brown et al. |
| 2015/0095240 | A1 | 4/2015 | Specogna et al. |
| 2015/0154408 | A1 | 6/2015 | Jakobsson |
| 2019/0080392 | A1 | 3/2019 | Youb |
| 2019/0130391 | A1 | 5/2019 | Wright et al. |
| 2019/0213371 | A1* | 7/2019 | Endress .................. G09C 1/00 |
| 2019/0312734 | A1 | 10/2019 | Wentz et al. |
| 2019/0334730 | A1 | 10/2019 | Endress et al. |
| 2019/0394047 | A1 | 12/2019 | Karame et al. |
| 2020/0076624 | A1 | 3/2020 | Cambou |
| 2020/0153627 | A1 | 5/2020 | Wentz |
| 2020/0162271 | A1 | 5/2020 | Cambou |
| 2020/0259653 | A1 | 8/2020 | Endress et al. |
| 2020/0322132 | A1 | 10/2020 | Covaci et al. |
| 2020/0344058 | A1* | 10/2020 | Wang .................... H04L 9/3213 |
| 2021/0058233 | A1 | 2/2021 | Lee et al. |
| 2021/0124817 | A1 | 4/2021 | Todd et al. |
| 2021/0390549 | A1 | 12/2021 | Rule et al. |
| 2022/0021526 | A1* | 1/2022 | Dugardin .............. H04L 9/3073 |
| 2022/0086127 | A1 | 3/2022 | Hinh |
| 2022/0147974 | A1 | 5/2022 | Law et al. |
| 2022/0231841 | A1 | 7/2022 | Delsuc et al. |
| 2022/0263668 | A1 | 8/2022 | Autiosalo et al. |
| 2022/0286303 | A1 | 9/2022 | Woo |
| 2023/0037023 | A1 | 2/2023 | Iwamura et al. |
| 2023/0098747 | A1 | 3/2023 | Vijayaraghavan |

FOREIGN PATENT DOCUMENTS

| | | | |
|---|---|---|---|
| CN | 111371868 | A | 7/2020 |
| CN | 111488624 | A | 8/2020 |
| EP | 1221120 | A1 | 7/2002 |
| EP | 1683298 | B1 | 9/2008 |
| EP | 2779067 | A1 | 9/2014 |
| EP | 2526505 | B1 | 6/2015 |
| EP | 1815637 | B1 | 4/2016 |
| EP | 3340212 | A1 | 6/2018 |
| EP | 3716525 | A1 | 9/2020 |
| GB | 2592980 | A1 | 9/2021 |
| JP | 2007513396 | A | 5/2007 |
| JP | 2007293703 | A | 11/2007 |
| JP | 2008517508 | A | 5/2008 |
| JP | 2011123909 | A | 6/2011 |
| JP | 2019121885 | A | 7/2019 |
| KR | 20210000485 | A | 1/2021 |
| WO | 03090259 | A2 | 10/2003 |
| WO | 2019116032 | A1 | 6/2019 |
| WO | 2020178752 | A1 | 9/2020 |
| WO | 2020183035 | A1 | 9/2020 |
| WO | 2020240290 | A1 | 12/2020 |
| WO | 2020240291 | A1 | 12/2020 |
| WO | 2021059054 | A1 | 4/2021 |

OTHER PUBLICATIONS

Combined Search and Examination Report under Sections 17 and 18(3) for Application No. GB2015487.8, mailed on Mar. 26, 2021, 08 pages.

Combined Search and Examination Report under Sections 17 and 18(3) for Application No. GB2015508.1, mailed on Mar. 31, 2021, 05 pages.

Combined Search and Examination Report under Sections 17 and 18(3) for Application No. GB2015541.2, mailed on Jul. 30, 2021, 10 pages.

Guin U., et al., "Ensuring Proof-of-Authenticity of IoT Edge Devices Using Blockchain Technology," IEEE International Conference on Internet of Things (iThings) and IEEE Green Computing and Communications (GreenCom) and IEEE Cyber, Physical and Social Computing (CPSCom) and IEEE Smart Data (SmartData), Jul. 30, 2018, pp. 1042-1049.

International Search report and Written Opinion issued in International Application No. PCT/EP2021/073964, mailed on Nov. 10, 2021, 14 pages.

International Search report and Written Opinion issued in International Application No. PCT/EP2021/073969, mailed on Dec. 2, 2021, 17 pages.

International Search report and Written Opinion issued in International Application No. PCT/EP2021/073986, mailed on Dec. 2, 2021, 18 pages.

International Search report and Written Opinion issued in International Application No. PCT/EP2021/073999, mailed on Dec. 8, 2021, 15 pages.

Islam M.N., et al., "Enabling IC Traceability via Blockchain Pegged to Embedded PUF," ACM Transactions on Design Automation of Electronic Systems, Apr. 5, 2019, vol. 24, No. 3, 23 pages, Retrieved from the Internet: URL: https://dl.acm.org/doi/pdf/10.1145/3315669.

Analog Devices, "Embedded Security and 1-Wire" [Retrieved on Feb. 20, 2023], 2 pages, Retrieved from the Internet: URL: https://www.analog.com/en/product-category/embedded-security-and-1wire.html.

Ardis K., "Demystifying the Physically Unclonable Function (PUF)," Feb. 1, 2019, Embedded Computing Design, 7 pages, Retrieved from the Internet: URL: https://embeddedcomputing.com/technology/processing/semiconductor-ip/demystifying-the-physically-unclonable-function-puf.

Braeken A., "Puf Based Authentication Protocol for IoT," Symmetry, MDPI, vol. 10, Aug. 20, 2018, 16 pages.

Bush S., "Chip Combines Secure Hash Algorithm and PUF to Protect IoT, Industrial and Medical," Electronics Weekly, Apr. 8, 2019, 2 pages, Retrieved from the Internet: URL: https://www.electronicsweekly.com/news/products/digital-integrated-circuits/chip-combines-secure-hash-algorithm-puf-protect-iot-industrial-medical-2019-04/.

Combined Search and Examination Report under Sections 17 and 18(3) for Application No. GB2015475.3, mailed on Jul. 12, 2021, 12 pages.

Combined Search and Examination Report under Sections 17 and 18(3) for Application No. GB2015498.5, mailed on Mar. 25, 2021, 6 pages.

EE Journal, "ChipDNA: Defend your IoT Designs from Hackers," YouTube, Dec. 4, 2017, 1 page, Retrieved from the Internet: URL: https://www.youtube.com/watch?v=awcbUYNbooQ.

(56)          References Cited

OTHER PUBLICATIONS

Gao Y., et al., "PUF-FSM: A Controlled Strong PUF, "IEEE Transactions on Computer-Aided Design of Integrated Circuits and Systems, 2017, 5 pages, Retrieved from the Internet: URL: 10.1109/tcad.2017.2740297.

Gassend B., et al., "Controlled Physical Random Functions and Applications," ACM Transactions on Information and System Security, Jan. 22, 2008, [Retrieved on Sep. 16, 2020], vol. 10, No. 4, pp. 22 pages.

Gassend B., et al., "Controlled Physical Random Functions, "18th Annual Computer Security Applications Conference, Dec. 2002, [Retrieved on Sep. 16, 2020], 12 pages.

Gassend B., et al., "Silicon Physical Random Functions,"Proceedings of the 9th ACM conference on Computer and Communications Security, Nov. 18, 2002, [Retrieved on Sep. 16, 2020], 13 pages.

Herder C., et al., "Physical Unclonable Functions and Applications: A Tutorial, "Proceedings of the IEEE, Aug. 2014, vol. 102, No. 8, pp. 1126-1141, Retrieved from the Internet: URL: 10.1109/jproc. 2014.2320516.

Hou S., et al., "A Lightweight and Secure-Enhanced Strong PUF design on FPGA, "IEICE Electronics Express, Dec. 2019, [Retrieved on Sep. 16, 2020], vol. 16, No. 24, 6 pages, Retrieved from the Internet: URL: 10.1587/elex.16.20190695.

Huang H., et al., "Bitcoin-Based Fair Payments for Outsourcing Computations of Fog Devices," Future Generation Computer Systems, Jan. 2018, vol. 78, pp. 850-858, Retrieved from the Internet: URL: https://www.researchgate.net/publication/312384979_Bitcoin-based_fair_payments_for_outsourcing_computations_of_fog_devices.

International Search report and Written Opinion issued in International Application No. PCT/EP2021/073961, mailed on Nov. 10, 2021, 13 pages.

International Search report and Written Opinion issued in International Application No. PCT/EP2021/073991, mailed on Feb. 28, 2022, 16 pages.

Intrinsic ID, "Protecting a Device's Root Secrets with SRAM PUF" an Intrinsic ID Whiteboard Video, YouTube, Jan. 13, 2020, https://www.youtube.com/watch?v=22x8QUcp8is.

Intrinsic ID, "SRAM PUF Technology," IoT Security, [Retrieved on Sep. 16, 2020], 1 page, Retrieved from the Internet: URL: https://www.intrinsic-id.com/sram-puf/.

Intrinsic ID., "SRAM PUF: The Secure Silicon Fingerprint," White Paper, 2017, 6 pages, Retrieved from the Internet: URL: https://www.semanticscholar.org/paper/SRAM-PUF-%3A-The-Secure-Silicon-Fingerprint/e823f6078233b3f9e826f7570e794689b354f1a1.

Maxim Integrated, "How ChipDNA PUF Technology Protects Your Secrets," Jan. 28, 2019, YouTube, 1 page, https://www.youtube.com/watch?v=b2AucKwx9ec.

Mohanty S.P., et al., "PUFchain: Hardware-Assisted Blockchain for Sustainable Simultaneous Device and Data Security in the Internet of Everything (IoE)," arxiv.org, Sep. 14, 2019, 38 pages.

Mouser Electronics, "Maxim's DS2477 Secure I²C Coprocessor, Now at Mouser, Delivers Authentication and Physical Security," Apr. 4, 2019, 1 page, Retrieved from the Internet: URL: https://eu.mouser.com/publicrelations_maxim_ds2477_2019final/.

Mouser Electronics, "Maxim Integrated DS2477 Secure I2C Coprocessor," Mar. 8, 2019, 2 pages, Retrieved from the Internet: URL: https://eu.mouser.com/new/maxim-integrated/maxim-ds2477-coprocessor/.

Nakamoto S, "Bitcoin: A Peer-to-Peer Electronic Cash System," Oct. 31, 2008, 6 pages, Retrieved from the Internet: URL: https://nakamotoinstitute.org/bitcoin/, on Feb. 18, 2020.

Ravikanth P.S., "Physical One-Way Functions," Massachusetts Institute of Technology, Mar. 2001, 154 pages.

Ruhrmair U., et al., "PUFs at a Glance," Design, Automation & Test in Europe Conference & Exhibition (Date), Mar. 2014, 6 pages, Retrieved from the Internet: URL: https://spqrlab1.github.io/papers/holcomb_PUFs_date14.pdf.

Ruhrmair U., et al., "Modeling Attacks on Physical Unclonable Functions," Proceedings of the 17th ACM Conference on Computer and Communications Security, Oct. 4, 2010, [Retrieved on Sep. 16, 2020], 11 pages.

Sutar S., et al., "Memory-Based Combination PUFs for Device Authentication in Embedded Systems," IEEE Transactions on Multi-Scale Computing Systems, vol. 4 (4), Oct. 2018, pp. 793-810.

Wisiol N., et al., "Breaking the Lightweight Secure PUF: Understanding the Relation of Input Transformations and Machine Learning Resistance," International Association for Cryptologic Research, retrieved from the Internet: URL: https://eprint.iacr.org/2019/799. pdf, on Jul. 10, 2019, 10 pages.

Zhang J., et al., "A PUF-FSM Binding Scheme for FPGA IP Protection and Pay-Per-Device Licensing,"IEEE Transactions on Information Forensics and Security, Jun. 2015, vol. 10, No. 6, pp. 1137-1150, Retrieved from the Internet: URL: 10.1109/tifs.2015. 2400413.

Zhang W., "Simplified Payment Verification," Aug. 25, 2020, 7 pages, Retrieved from the Internet: URL: https://medium.com/nchain/simplified-payment-verification-48ac60f1b26c.

Asif R., et al., "Proof-of-PUF Enabled Blockchain: Concurrent Data and Device Security for Internet-of-Energy," Sensors, Dec. 23, 2020, vol. 21, No. 1,32 pages.

Bitstagram, "Bitcoin Genesis Block," 2018, Retrieved from the Internet: https://bitstagram.bitdb.network/, 4 pages.

BSV Explorer, "Mainnet Summary," Retrieved on Aug. 20, 2020, 2 pages, Retrieved from the Internet: URL: https://whatsonchain.com/.

Connolly D., "Bitcoin SV," GitHub 2018, retrieved from the internet: https://github.com/bitcoin-sv/bitcoin-sv, 2 pages.

Dahlberg R., et al., "Efficient Sparse Merkle Trees Caching Strategies and Secure (Non-) Membership Proofs," 2016, retrieved from the internet: https://eprint.iacr.org/2016/683.pdf, 16 pages.

Hearn M., et al., "Connection Bloom filtering," Retrieved on Aug. 20, 2020, 10 pages, Retrieved from the Internet : URL: https://github.com/bitcoin/bips/wiki/Comments:BIP-0037.

International Search Report and Written Opinion for International Application No. PCT/EP2022/050955 mailed May 13, 2022, 13 pages.

International Search Report and Written Opinion for International Application No. PCT/EP2022/059690 mailed Jul. 29, 2022, 12 pages.

International Search report and Written Opinion issued in International Application No. PCT/EP2022/056543, mailed on Jun. 21, 2022, 14 pages.

Islam., M.N., et al., "Remote Configuration of Integrated Circuit Features and Firmware Management via Smart Contract," 2019 IEEE International Conference on Blockchain (Blockchain), Jul. 14, 2019, pp. 325-331.

Keane S., "The Huawei Controversy: Everything You Need To Know," Security, Feb. 22, 2019, retrieved from the internet: https://www.cnet.com/news/the-huawei-controversy-everything-you-need-to-know/, 1 page.

Longo R., et al., "Threshold Multi-Signature with an Offline Recovery Party," IACR, International Association for Cryptologic Research, vol. 160305, [Retrieved on Jan. 7, 2020], 31 pages, Retrieved from the Internet: URL: https://eprint.iacr.org/2020/023.pdf.

Merkle R.C., "Secrecy, Authentication, and Public Key Systems," Information System Laboratory, Jun. 1979, Technical Report No. 1979-1, retrieved from the internet: http://www.ralphmerkle.com/papers/Thesis1979.pdf, 193 pages.

Nakamoto S., "Bitcoin: A Peer-to-Peer Electronic Cash System," 2009 [Oct. 31, 2008], Retrieved from the internet: https://bitcoin.org/bitcoin.pdf, 9 pages.

Obermaier J., et al., "An Embedded Key Management System for PUF-based Security Enclosures," 7th Mediterranean Conference on Embedded Computing (MECO), Jun. 2018, 6 pages.

Relay R., "Hardware Wallets Explained," Medium, Feb. 27, 2019, [Retrieved on: Jan. 27, 2021], 7 pages, Retrieved from the Internet: URL: https://medium.com/radartech/hardware-wallets-explained-da8bd93ce801.

Schrijen G-J., SRAM PUF: A Closer Look at the Most Reliable and Most Secure PUF, Intrinsic ID, 2020, 3 pages, Retrieved from the

(56)        References Cited

OTHER PUBLICATIONS

Internet: URL: https://www.design-reuse.com/articles/47782/sram-puf-a-closer-look-at-the-most-reliable-and-most-secure-puf.html.
Weather SV, Retrieved on Aug. 20, 2020, 2 pages, Retrieved from the Internet: URL: https://weathersv.app/find.
Wuille P., "Hierarchical Deterministic Wallets," GitHub, Retrieved from the Internet: URL:https://github.com/bitcoin/bips/blob/master/bi p-0032, MediaWiki, Feb. 11, 2012, pp. 1-18.
Mars, Ayoub et al., Fair Exchange and Anonymous E-Commerce by Deploying Clone-Resistant Tokens. 2019 42nd International Convention on Information and Communication Technology, Electronics, and Microelectronics (MIPRO), (2019).
Fuchita Y., "Special Feature: Innovation and Finance—Blockchain and Financial Transaction Innovation," Nomura capital markets quarterly, Japan, Nomura Institute of Capital Markets Research, Nov. 1, 2015, vol. 19, No.2 (consecutive number of issue 74), 30 pages.
JP2023-519324 Office Action dated Jan. 20, 2026, 2 pages.
EP25213015.8 Extended European Search Report dated Jan. 28, 2026, 8 pages.

* cited by examiner

Transaction
from Alice to Bob

Validated by running: Locking
script from output 203 of $Tx_0$,
together with Alice's unlocking
script from input 202 of $Tx_1$. This
checks that Alice's unlocking script
in $Tx_1$ meets the condition(s)
defined in the locking script of
previous transaction $Tx_0$.

602

Response data store

601

603

PUF mod.

103V

103T

102V

Verifying party

102T

Target party (party to be verified)

PHYSICALLY UNCLONABLE FUNCTIONS

CROSS REFERENCE TO RELATED APPLICATIONS

This application is the U.S. National Stage of International Application No. PCT/EP2021/073961 filed on Aug. 31, 2021, which claims the benefit of United Kingdom Patent Application No. 2015475.3, filed on Sep. 30, 2020, the contents of which are incorporated herein by reference in their entireties.

TECHNICAL FIELD

The present disclosure relates to the field of physically unclonable functions, PUFs.

BACKGROUND

A physically unclonable function (PUF) is a term of art referring to a function comprising a deterministic but unpredictable physical phenomenon. A PUF is also sometimes referred to as a physical random function. A PUF receives an input, referred to as a "challenge", and generates an output, referred to as the corresponding "response", in dependence on the challenge and the physical phenomenon employed by the PUF. PUFs are sometimes classified into strong and weak PUFs. A strong PUF is capable of generating a respective response for a large number of different challenges, typically being able to take any arbitrary value of the challenge. A weak PUF can generate a response for only a single response or a small number of responses (typically the challenge cannot take any arbitrary value). In other words, a strong PUF has a large number of challenge-response pairs (it has a large challenge-response space), whilst a weak PUF has a single challenge-response pair or limited number of challenge-response pairs (a small or limited challenge-response space). According to one definition, a weak PUF has a number of responses linear in the number of challenge bits, or more generally one that does not grow more than linearly in other parameters.

A known example of a strong PUF is an optical PUF. For instance, an optical PUF may comprise a laser, an optical sensor, and a solid optical medium with bubbles or other such artefacts set in the medium. The laser is shone through the optical medium at a controllable angle to create a diffraction or scattering pattern (which is an effect of the bubbles or artefacts in the medium). The sensor is arranged to sense this pattern. The challenge is the angle of the laser, and the response is generated based on the sensed pattern.

An example of a weak PUF is an SRAM PUF. In this case the challenge is turning on the SRAM (static random access memory). Due to slight manufacturing differences from one SRAM to another, then the SRAM cells will happen to fall into a unique pattern of 0/1 states upon power up, which thus forms a characteristic fingerprint of the individual SRAM. The PUF is configured to output this as the response upon power-up.

A PUF can be used as a means to generate a key, such as for use in cryptographic algorithms (e.g. to sign or encrypt a document). Another application of a PUF is for identification of a device such as a computer device that incorporates the PUF. If the expected response for a given challenge has previously been determined, then a verifying party can later challenge a target device with the challenge and check whether it gives the expected response, and thereby check whether the target device is the device associated with the expected response.

Because of the limited challenge response space, the input-output (i/o) interface to a weak PUF tends to be restricted to only one or a restricted number of parties (e.g. only one or a limited number of trusted parties may be physically or legally granted access to the PUF, or the interface to the PUF may be password protected or the like). I.e. only the party or parties in question can gain access to the input to the PUF needed to submit the challenge and the output from which the response is received back. For strong PUFs on the other hand, the i/o interface to a strong PUF may be made widely available to a large or unlimited number of parties, not all of whom are necessarily known or trusted parties. The reason is that the challenge response space is large enough that it is infeasible for an adversary to enumerate all of the challenge-response pairs, and therefore the ability for an adversary to freely access the PUF should not compromise its security by allowing an enumeration and spoofing of the PUF, as would be the case for weak PUFs.

In a different area of technology, a blockchain refers to a form of distributed data structure whereby a duplicate copy of the blockchain is maintained at each of a plurality of nodes in a distributed peer-to-peer (P2P) network (referred to below as a "blockchain network") and widely publicised. The blockchain comprises a chain of blocks of data, wherein each block comprises one or more transactions. Each transaction, other than so-called "coinbase transactions", points back to a preceding transaction in a sequence which may span one or more blocks going back to one or more coinbase transactions. Coinbase transactions are discussed further below. Transactions that are submitted to the blockchain network are included in new blocks. New blocks are created by a process often referred to as "mining", which involves each of a plurality of the nodes competing to perform "proof-of-work", i.e. solving a cryptographic puzzle based on a representation of a defined set of ordered and validated pending transactions waiting to be included in a new block of the blockchain. It should be noted that the blockchain may be pruned at some nodes, and the publication of blocks can be achieved through the publication of mere block headers.

The transactions in the blockchain may be used for one or more of the following purposes: to convey a digital asset (i.e. a number of digital tokens), to order a set of entries in a virtualised ledger or registry, to receive and process time-stamp entries, and/or to time-order index pointers. A blockchain can also be exploited in order to layer additional functionality on top of the blockchain. For example blockchain protocols may allow for storage of additional user data or indexes to data in a transaction. There is no pre-specified limit to the maximum data capacity that can be stored within a single transaction, and therefore increasingly more complex data can be incorporated. For instance this may be used to store an electronic document in the blockchain, or audio or video data.

Nodes of the blockchain network (which are often referred to as "miners") perform a distributed transaction registration and verification process, which will be described in more detail later. In summary, during this process a node validates transactions and inserts them into a block template for which they attempt to identify a valid proof-of-work solution. Once a valid solution is found, a new block is propagated to other nodes of the network, thus enabling each node to record the new block on the blockchain. In order to have a transaction recorded in the blockchain, a user (e.g. a blockchain client application) sends the transaction to one of the nodes of the network to be propagated. Nodes which receive the transaction may race to find a proof-of-work solution incorporating the validated transaction into a new block. Each node is configured to enforce the same node protocol, which will include one or more conditions for a transaction to be valid. Invalid transactions will not be propagated nor incorporated into blocks. Assuming the transaction is validated and thereby accepted onto the blockchain, then the transaction (including any user data) will thus remain registered and indexed at each of the nodes in the blockchain network as an immutable public record.

The node who successfully solved the proof-of-work puzzle to create the latest block is typically rewarded with a new transaction called the "coinbase transaction" which distributes an amount of the digital asset, i.e. a number of tokens. The detection and rejection of invalid transactions is enforced by the actions of competing nodes who act as agents of the network and are incentivised to report and block malfeasance. The widespread publication of information allows users to continuously audit the performance of nodes. The publication of the mere block headers allows participants to ensure the ongoing integrity of the blockchain.

In an "output-based" model (sometimes referred to as a UTXO-based model), the data structure of a given transaction comprises one or more inputs and one or more outputs. Any spendable output comprises an element specifying an amount of the digital asset that is derivable from the proceeding sequence of transactions. The spendable output is sometimes referred to as a UTXO ("unspent transaction output"). The output may further comprise a locking script specifying a condition for the future redemption of the output. A locking script is a predicate defining the conditions necessary to validate and transfer digital tokens or assets. Each input of a transaction (other than a coinbase transaction) comprises a pointer (i.e. a reference) to such an output in a preceding transaction, and may further comprise an unlocking script for unlocking the locking script of the pointed-to output. So consider a pair of transactions, call them a first and a second transaction (or "target" transaction). The first transaction comprises at least one output specifying an amount of the digital asset, and comprising a locking script defining one or more conditions of unlocking the output. The second, target transaction comprises at least one input, comprising a pointer to the output of the first transaction, and an unlocking script for unlocking the output of the first transaction.

In such a model, when the second, target transaction is sent to the blockchain network to be propagated and recorded in the blockchain, one of the criteria for validity applied at each node will be that the unlocking script meets all of the one or more conditions defined in the locking script of the first transaction. Another will be that the output of the first transaction has not already been redeemed by another, earlier valid transaction. Any node that finds the target transaction invalid according to any of these conditions will not propagate it (as a valid transaction, but possibly to register an invalid transaction) nor include it in a new block to be recorded in the blockchain.

An alternative type of transaction model is an account-based model. In this case each transaction does not define the amount to be transferred by referring back to the UTXO of a preceding transaction in a sequence of past transactions, but rather by reference to an absolute account balance. The current state of all accounts is stored by the nodes separate to the blockchain and is updated constantly.

SUMMARY

According to one aspect disclosed herein, there is provided a computer-implemented method for enabling one or more verifying parties to verify an identity of a target comprising a target party or device of the target party. The method comprises, in a set-up phase: storing, in a data store, a respective piece of response data for each of a set of one or more responses resulting from a setting-up party inputting a respective set of one or more challenges into a PUF module comprising a physically unclonable function, PUF, to generate the one or more responses based on the PUF. The method further comprises:

storing an indication of the set of challenges in the data store, wherein the indication does not comprise a value of each of the challenges in the set, but rather a master challenge from which the set of challenges is derivable by applying a derivation function to the master challenge; thereby making at least one of the pieces of response data and the respective master challenge available to the one or more verifying parties for verifying the identity of the target in a subsequent verification phase. The respective piece of response data for each response may comprise the respective response itself or data derived therefrom.

The method thus provides a lightweight means of storing challenge-response (CR) pairs or the like, which does not require the challenge to be explicitly stored for every response.

In embodiments, the master challenge may comprise identification information of the target, e.g. passport information, biometric information or secret personal information (e.g. mother's maiden name) of the target party. This way a set of challenges can readily be provided that is unique to the particular target, such as to enable different sets of challenges to be derived for multiple different targets. The identification information may comprise information that the target party already knows or keeps secure (e.g. secret).

In embodiments the data store may comprise a peer-to-peer publication medium such as a blockchain. Alternatively the data store could be implemented in trusted third party computer equipment (e.g. a server of a trusted third party, comprising one or more server units at one or more geographic sites).

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Figure 1:
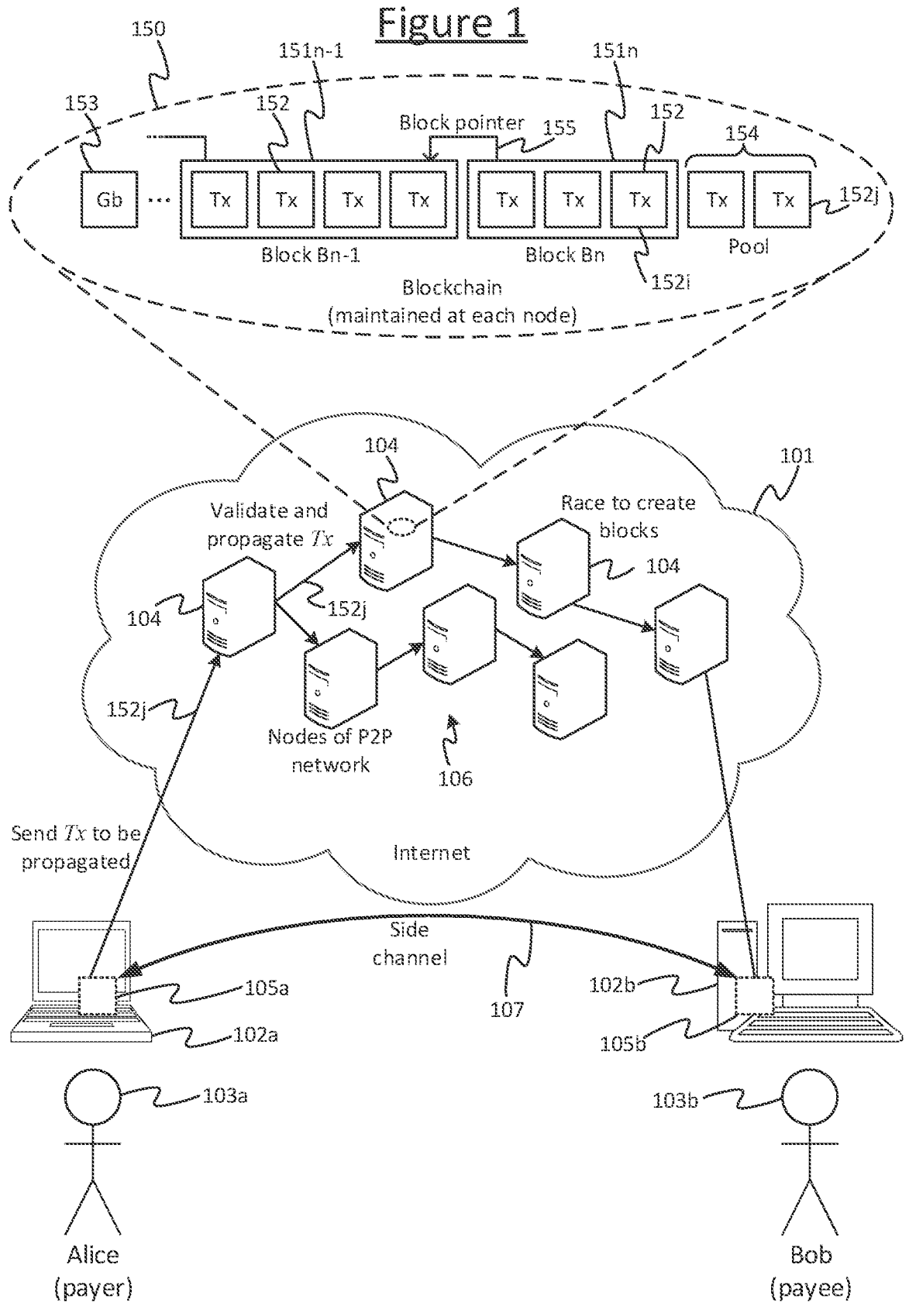
FIG. 1 is a schematic block diagram of a system for implementing a blockchain.

The robustness of systems such as key-generation systems and privacy-preserving identity systems for both humans and machines may be improved by the involvement of physically unclonable functions (PUFs). These may be parties and/or autonomous machines that are interacting with one another, or with a public system such as the blockchain.

These functions, which are based on physical systems and secured by the assumption of random, undeterminable and non-repeatable variations in the manufacturing of physical devices, can be used to fortify a link established between a human identity and their device, or furthermore to establish an unforgeable unique identity for a device itself.

In the literature, PUFs are categorised into weak and strong types, categorised by their distinct properties. According to one aspect below, there is provided a generalised extended PUF (ePUF) framework for describing a practical PUF device that has the benefits of both of these types of PUF; namely that an ePUF may produce a large range of challenge-response pairs to be used in applications, while remaining practical and cost-efficient to implement.

More generally various aspects relating to PUFs and the management of challenge-response pairs are disclosed herein. These different aspects may be used individually or in any combination. These include for example:

I. an expanded PUF for expanding the challenge-response space of a PUF;

II. a set of blockchain-agnostic protocols for establishing human and/or device identity by using ePUF devices;

III. a framework for improving these identity protocols by leveraging the blockchain;

IV. a technique for lightweight storage of challenge-response pairs; and

V. a set of novel applications of ePUF devices to a variety of problems, such as the implementation of KYC for simplified payment verification (SPV) processes, and for verifiable computation by devices.

1. PHYSICALLY UNCLONABLE FUNCTIONS (PUFS)—PRELIMINARIES

The term physically unclonable functions (PUFs) refers to a class of physical systems and devices which act as general-purpose random functions. These PUFs are uniquely characterised by their physical properties, often at the sub-micron scale, which means each can be uniquely identified and verified by probing those properties with physical stimuli. At a high level, one can consider PUFs as functions that map challenges to responses; pairs of which are often referred to as challenge-response pairs (CRPs). One can use the following notation to describe such a map F as:

$$F: C \rightarrow R \forall (C,R) \in \Phi_F,$$

where C, R denote challenges and responses respectively, and $\Phi_F$ is the set of all challenge-response pairs of the form (C, R) that can be produced by the PUF.

The unique physical properties of a PUF are typically the result of random process variations inherent in the manufacturing of physical devices, such as silicon chips. Assumptions typically made about PUFs are that:

1. it is intractable to completely determine the parameters of the physical system by any form of analysis; and 2. the parameters of the physical system are not known by any party, including the original manufacturer of the device that is used as a PUF. This assumption if often referred to as manufacturer-resistance.

These assumptions allow a PUF to be used to produce unpredictable yet deterministic responses to arbitrary challenges. This challenge-response process treats a PUF like a physical black box, as illustrated in FIG. 3.

Figure 3:
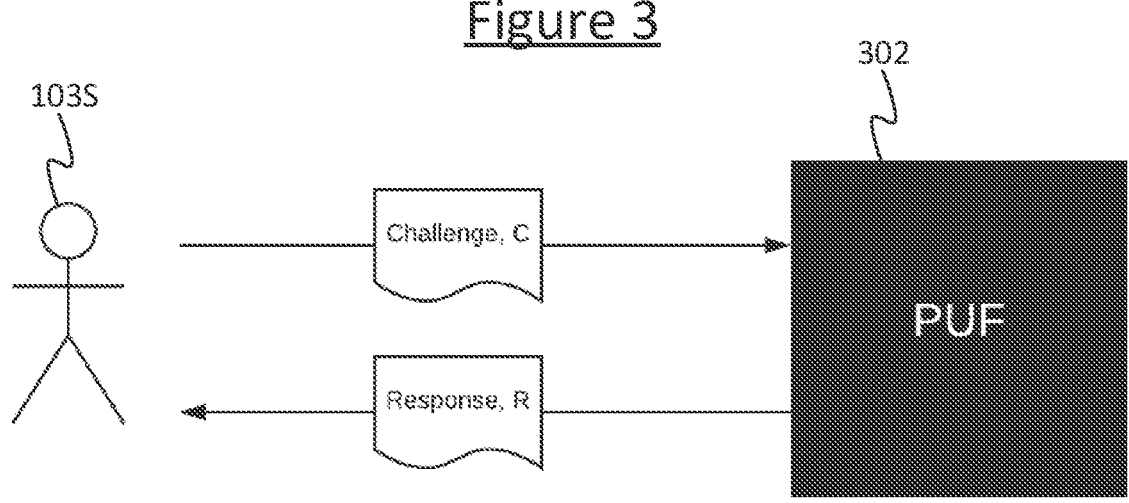

FIG. 3 shows a PUF 302 modelled as a physical black box. A submitting party 103S submits a challenge C as an input to the PUF 302, and in response the PUF 302 generates a corresponding response R. The submitting party submits the challenge from a device such as a computer device (not shown) of the submitting party, which could be the same or a different device as that in which the PUF 302 itself is implemented.

The submitting party 103S could be a party generating challenge-response (CR) pairs as part of a set-up phase (examples discussed later) to establish a set of expected responses linked to the identity of a target party or device. Or the submitting party 103S could be a verifying party submitting a challenge in a later verification phase in order to verify that the generated response matches an expected response, thus verifying the identity of a target device comprising the PUF 302 or a target party in possession of the PUF.

In another example scenario, the submitting party 103S may be a party who wishes to use the generated response as a key, or a seed to generate a key, for use in a cryptographic application such as a blockchain application (e.g. to sign a blockchain transaction).

Figure 4:
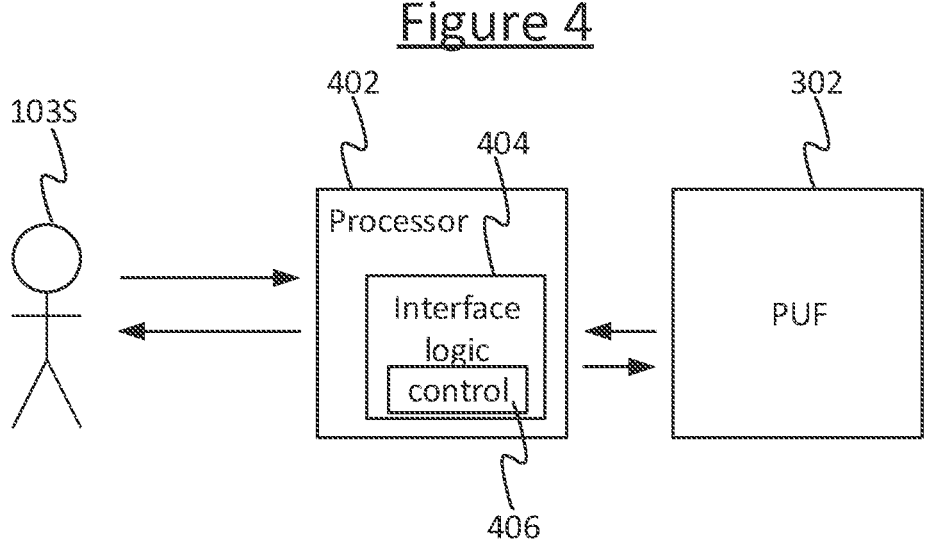
FIG. 4 is a schematic block diagram of a system comprising a PUF.

FIG. 4 shows a system comprising an example of an interface to a PUF 302. The system comprises a processor 402 and the PUF 302. The interface comprises interface logic 404, which is stored in memory and arranged to run on the processor 402. The memory on which the interface logic 404 is stored may comprise one or more memory units employing one or more storage media (e.g. magnetic medium such as magnetic disk or tape, or an electronic medium such as ROM, EPROM, EEPORM, flash memory, SRAM, DRAM, etc.). The processor 402 may comprise one or more processing units (e.g. a general purpose processor such as a CPU, or an application specific or accelerator processor such as a GPU, DSP or crypto-processor). It is also not excluded that the interface logic 404 could instead be implemented partially or wholly in dedicated hardware circuitry, or configurable or reconfigurable circuitry such as a PGA or FPGA.

The submitting party 103S uses a device (not shown) to submit a challenge C to the PUF 302 via the interface logic 404. The device used by the submitting party 103S could for example be a computer device, either an external computer device or the same computer device on which the processor 402 is implemented. The PUF 302 then returns the corresponding response R back to the device of the submitting party 302 via the interface logic 404. In some embodiments, discussed in more detail later, the interface logic 404 may comprise access control logic 406 which restricts access to the PUF 302 to only certain parties, e.g. those that can present recognized credentials such as a password, PIN or biometric information. And/or, a physical interface to the device comprising the processor 402 may be restricted, such as by being located in a room or complex to which only authorized personnel have access, or being kept in a locked box or cabinet. In alternative systems however, the interface logic 404 could be made available for any party to query with challenges.

The challenge-response process of a PUF allows the generation of pseudo-random data values by extracting these challenges from chosen responses. For example, PUFs can be used as key-generators to extract random repeatable data to be used in cryptography. Note that the PUF 302 acts in a deterministic and repeatable way, such that a PUF will yield an identical response when given the same challenge on multiple separate occasions.

There are a number of different physical systems that can be used as PUFs, and there are many different implementations of PUFs using these systems. An illustrative example of a PUF is an optical medium that contains bubbles, which, when probed by a laser, produces a response diffraction or 'speckle' pattern that is deterministically determined by (i) the position of the laser, and (ii) the small-scale parameters of the optical medium.

1.1. Classes of PUFs 1.1.1 Weak PUF: Weak PUFs are characterised by having a small challenge-response space, and many have only a single challenge such that the size of the CRP space is $|\Phi_F|=1$. In general, the challenge-response space for a weak PUF is considered to be of the order O(n), where n is the number of components in the PUF that are subject to uncontrollable manufacturing variations.

In the case of weak PUFs, it is typically also assumed that access to the responses of the PUF is restricted. This is because, due to the small number of CRPs serviced by the weak PUF, an adversary may enumerate all such pairs in a reasonable time and may therefore emulate or 'spoof' the behaviour of the PUF. This restriction is sometimes referred to as a restricted challenge-response interface when discussing the behaviour of weak PUFs.

These properties make weak PUFs most naturally suited to use in cryptographic applications as a key-generator, where the one (or few) CRP(s) generated by the PUF may be used as a secret key for cryptographic operations, such as for encrypting on-device non-volatile memory (NVM) or for use as an HMAC symmetric key. In such cases, the key derived from the response of the PUF must be kept secret and known only to the possessor of the device for both the security of the cryptographic processes performed and also of the PUF itself.

A prominent and widely-implemented example of a weak PUF is the SRAM PUF, where the term 'SRAM' refers to 'static random-access memory'. The design of the SRAM PUF leverages variations in the 'powered-on' state of SRAM chips, which each have a unique fingerprint owing to variations in which SRAM cells in the chip are in '0' or '1' states when the chip is powered-on.

In this case, the PUF construction is considered weak because there is one fixed mode to probe the PUF (i.e. by powering on the SRAM chip), and thus only a single CRP. In this case, the one and only 'challenge' is to supply the SRAM chip with power, and the response is the unique fingerprint derived from its powered-on state. Access-control, to ensure the secrecy of the response, can also be implemented using the existing memory access-control policy or mechanism in place on the device in which the SRAM PUF is used, or alternative mechanisms employed on the device.

A feature of some PUF implementations, such as in the case of the SRAM PUF, is the use of error-correction in the responses generated by PUFs to ensure the same challenge will yield the same response in a condition- and time-invariant manner. Details of such error-correction techniques are known to a person skilled in the art. In some cases, the error-correction process may require that PUF devices are 'enrolled' initially, to provide a source of helper data which is combined with a response later generated on demand to facilitate the error correction.

1.1.2. Strong PUFs: by contrast to weak PUFs, strong PUFs are characterised by having a large space of possible challenge-response pairs (CR-pairs, or CRPs) that can be utilised. This large space of CRPs means that it is considered infeasible for an adversary to enumerate all of the challenge-response pairs within the domain of a strong PUF in polynomial time. This property means that strong PUFs may have an unprotected challenge-response interface in general, since the ability for an adversary to freely access the PUF will not compromise its security by allowing an enumeration and spoofing of the PUF, as would be the case for weak PUFs. This class of PUFs is also said to produce unpredictable responses, even from the perspective of an adversary who knows a large subset of CDF, meaning that strong PUFs act more like a cryptographic hash function with a large domain.

However, there is a restriction placed on strong PUFs that only the response R should be given by the PUF when presented with a challenge C, and no other information about the internal working or operation of the PUF should be leaked in the process. This restriction is to mitigate various analytical attacks whereby an adversary may try to characterise the physical system underpinning the behaviour of the PUF. These are often referred to as modelling attacks in the literature.

Similarly to weak PUFs, some strong PUF constructions may rely on error correction techniques to ensure the accuracy of responses generated by the devices.

The main existing applications of strong PUFs are to facilitate system authentication and identification using the inherent challenge-response mechanism. These mechanisms rely on protocols that involve the creation of CRPs as shared secrets directly between two parties, and often require at least one party to generate a table of CRPs ahead of time (an initial set-up) to be used as authentication tokens for the other party.

One of the earliest examples of a strong PUF implementation was the optical PUF system. In this construction, the PUF comprises an optical medium that contains randomly-distributed physical imperfections, as a result of manufacturing variations, which scatter incident light.

This PUF construction is able to be probed by a laser beam directed at the optical scattering medium. In this case, the direction and polarization of the incident beam form the challenge, and the scattering pattern observed is taken as the PUF response.

However, this strong PUF construction is complex to implement, due to the fact that the measuring device is separate from the rest of the PUF device and is also difficult to integrate directly with semiconductor components. This is in addition to costs associated with the apparatus itself, and the lack of portability of the arrangement reducing its utility for everyday applications.

An electrical integrated strong PUF, known as the arbiter PUF (APUF), has since been proposed, which overcomes some of these issues. This construction utilises signal multiplexing and leverages runtime delays in electrical components. Many other strong PUF constructions have been proposed in parallel, although many lack practical suitability for widespread use, and many have associated weakness regarding security and potential attack vectors. For example, a highly problematic potential attack is the man-in-the-middle attack, whereby an attacker can intercept challenges submitted in the clear and spoof certified computations.

1.1.3. Controlled PUFs: a third class of PUFs, known as a controlled PUF (CPUF), improves on existing strong PUF constructions, but using them as a building block. These PUFs take a strong PUF and apply an additional control logic that restricts access to the PUF, which distinguishes them from non-controlled strong PUFs which otherwise may have unprotected challenge-response interfaces.

As shown in FIG. 4, the control logic 406 applied to the PUF, which is now part of a larger PUF device, may mediate access to the PUF 302 itself. This means that the control logic component 406 can restrict which challenges are presented to the PUF, as well as controlling how the subsequent responses are revealed to the user.

In CPUF construction, preferably the control logic component 406 should be embedded within or enveloped by the strong PUF component. According to one definition of a CPUF, a PUF is said to be controlled if can only be accessed via an algorithm that is physically linked to the PUF in an inseparable way (i.e. an attempt to circumvent the algorithm will lead to the destruction of the PUF). This embedding should make the probing of the control logic considerably more difficult.

This will establish a mutually-beneficial relationship between the PUF component and the control logic component, such that each mitigates a type of attack on the other. Namely, the encapsulation of the control logic within the PUF device itself protects the control logic from physical or invasive attacks because this would irreparably damage the PUF component and alter its responses, while the control logic naturally protects the PUF component from protocol-level attacks to extract CRPs or other information about the internal physical system underlying the PUF itself.

The applications of CPUFs are much the same as strong PUFs, but can be achieved in a more robust manner. In particular, certified computations and proof of execution can be achieved easily with the protocols outlined above.

An early example of a CPUF, which extended the design of the strong arbiter PUF (APUF), required a control logic to be intertwined with the APUF itself in the manner already described, such that the control logic and APUF mutually protect one another from different types of attack. The controlled APUF design generates a large set of CRPs from a single static response from an integrated circuit (IC) by incorporating the transient response of the system.

Another known example of a controlled PUF is a PUF-FSM construction. This comprises a strong PUF (an APUF in reality) in conjunction with a finite state machine (FSM) that acts as the control logic that restricts access to the challenge-response interface of the APUF component itself.

1.2. Discussion 1.2.1. Practicality: it is acknowledged in the literature that to produce strong PUFs that are both practical and light-weight, whilst also being integrable with standard complementary metal-oxide semiconductor (CMOS) components, is highly challenging. By contrast, weak PUFs such as the SRAM PUF are inexpensive to produce and can be trivially combined with integrated circuit architectures.

1.2.2. Attacks on PUFs: there are a number of different attacks that have been proposed and studied, where different attacks may target specific PUF constructions or classes. Some of the most widely-known attack types are listed as follows.

MITM attacks—these attacks target PUFs uncontrolled strong PUFs, where an adversary may intercept challenges made in the clear to impersonate or spoof the response of a PUF, particularly when used for certified computation.

Modelling attacks—these attacks have proven a vulnerability for many strong PUF constructions, such as the APUF.

Chosen challenge attacks—these attacks also affect strong PUFs and are partly the motivation for moving towards CPUF architectures.

There are also other issues with various PUF designs, such as lack of uniqueness in some cases, which have let to exploits that undermine the security of the PUF system in question.

1.2.3 Security models: the security models of PUF constructions tend to share some similarities, such as the assumption that the random process or manufacturing variations from which their CRPs arise is manufacturer-resistant and that it is intractable to characterise the physical system of the PUF by analytical means. However, there are also some differences in the security models for the three main PUF classes.

Weak PUFs—the security of a weak PUF relies on the assumption that its CRPs are kept secret, otherwise the device can be enumerated and impersonated. This means that a weak PUF can be used to provide a source of entropy and secure storage of that entropy for cryptographic operations, but the actual CRP response data itself is not revealed publicly in the process.

Strong PUFs—the security of a strong PUF is dependent on the fact that its CRP space tends to be exponential in the number of challenge bits, and thus the enumeration of the entire space is infeasible in a reasonable timeframe. This means that the CRP responses of a strong PUF can be revealed by the device, unlike in the case of weak PUFs.

Controlled PUFs—the security of a controlled PUF is determined by the combination of control logic, which protects from protocol level attacks, and the PUF itself, which protects from physical attacks.

Two properties of strong PUFs, which differentiate them from weak PUFs, are as follows. Firstly, a strong PUF has a large set of CRPs. This means that a strong PUF has a large challenge space $\Phi_F$, where a weak PUF has typically only one (or few) challenge(s) available to it. A strong PUF is moreover considered unpredictable with respect to any and all known CRPs. In other words, knowledge of an arbitrary number of CRPs gives no advantage in predicting the response of a new challenge.

Secondly, a strong PUF can have an unprotected challenge-response interface. The assumption is made that a given strong PUF does not require access-control logic to restrict access to the challenge-response interface. This means that any party with physical access to the PUF may apply challenges, and obtain responses, arbitrarily, without revealing any additional information about the PUF or its physical properties.

A controlled PUF has a protected challenge-response interface but also a large challenge-response space like a strong PUF.

2. EXPANDED PUF (ePUF)

The following discloses a system and method for expanding the challenge-response (CR) space of a PUF, by generating multiple secondary CR pairs from a given CR pair of the base PUF 302. This may be referred to herein as an "expanded PUF", or "ePUF". The idea could be used for example to expand the challenge-response space of a weak PUF with only one or a limited number of inherent CR pairs, without the complexity or impracticality of a typical strong PUF mechanism (such as an optical PUF requiring a laser, optical medium and sensor). However, in principle the disclosed techniques could be used more generally to expand the number of CR pairs of any base PUF, whether weak, strong, controlled or otherwise; or to transform a CR pair of any PUF for other purposes, such as obfuscation or re-usability.

Figure 5A:
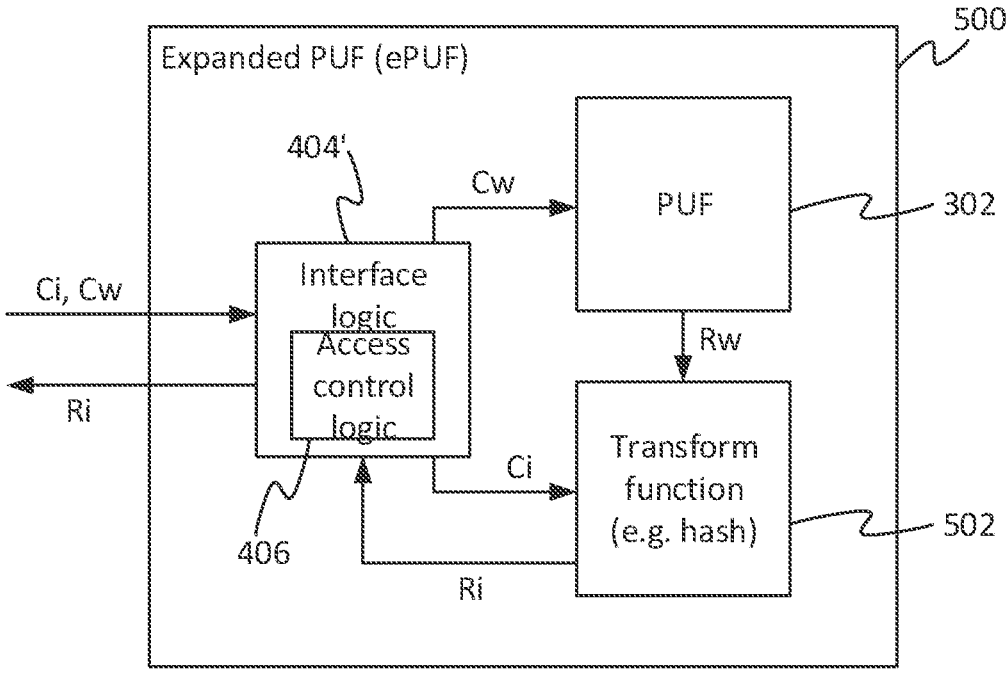
FIG. 5A is a schematic block diagram of an expanded PUF in accordance with embodiments disclosed herein.

FIG. 5A shows an expanded PUF (ePUF) 500 in accordance with embodiments disclosed herein. The ePUF 500 comprises a constituent base PUF 302, which could for example be a conventional weak PUF. The ePUF 500 further comprises a transform function 502, e.g. a hash function such as a cryptographic hash function (for instance SHA256, etc.). The ePUF 500 also comprises interface logic 404', which may be similar to the interface logic 404 discussed in relation to FIG. 4, but with additional interfacing functionality. The interface logic 404' and transform function 502 may be implemented in software, e.g. embedded firmware, which is stored in memory and arranged to run on a processor 402 (such as shown in FIG. 4, but running the additional functionality of the interface 404' and transform function 502). The memory on which the interface function 404' and transform logic 504 are stored may comprise one or more memory units employing one or more storage media (e.g. magnetic medium such as magnetic disk or tape, or an electronic medium such as ROM, EPROM, EEPORM, flash memory, SRAM, DRAM, fuse latches, etc.).

The processor on which they are run may comprise one or more processing units (e.g. a general purpose processor such as a CPU, or an application specific or accelerator processor such as a GPU, DSP or crypto-processor). It is also not excluded that the interface logic 404' and/or transform function 502 could instead be implemented partially or wholly in dedicated hardware circuitry, or configurable or reconfigurable circuitry such as a PGA or FPGA.

The interface logic 404' is operatively coupled to the transform function 502 and optionally also to the base PUF 302. The base PUF 302 is operatively coupled to the transform function. The interface logic 404' is arranged to receive in input from, and provide an output to, a device of a submitting party 103S (not shown in FIG. 5A), e.g. a computer device, which could be the same device that the ePUF 500 is implemented on or an external device. The submitting party 103S could be a party using the ePUF 500 to perform a set up, to generate a set of challenges and expected responses to be linked to an identity for future reference; or could be a verifying party using the PUF at a later time to verify whether the generated response matches a previously-established expected response (or a challengee generating the response to provide to a verifying party). In another example application, the submitting party 103S could be using the ePUF 500 to produce a response for use as a key, or as a seed for generating a key. E.g. this could be used as a cryptographic key to encrypt or sign a message, e.g. to sign a part of a blockchain transaction.

The base PUF 302 is operable to generate a "primary" response Rw as an output, corresponding to receiving a "primary" challenge Cw as an input. The "primary" challenge-response (CR) pair herein refers to a base or "native" (i.e. inherent) CR pair of the base, constituent PUF 302. In some embodiments, the base PUF 302 may be capable of generating only a single base (i.e. primary) response Cw in response to a single challenge Cw, like a weak PUF.

In operation, the interface logic 404' receives challenge data (a challenge input) comprising at least a "secondary" challenge Ci from the device of the submitting party 103S. In addition, the primary (base) challenge Cw is input to the base PUF 302 in order to generate the primary (base) response Rw. In embodiments the submitting party 103S is required to include the base challenge Cw in the challenge data input to the ePUF 500, and the interface logic 404' routes this to the base PUF 302 in order to generate the primary response Rw. However, it is not excluded in other embodiments that the primary challenge Cw is input to the base PUF 302 from an internal source such as a memory, fuse latches or dedicated circuitry. Either way, the transform function 502 is arranged to receive as inputs: a) the secondary challenge Ci as received in the input challenge data from the submitting party, and b) the primary response Rw as generated by the base PUF 302. The transform function 502 is a function configured to map a combination of these, deterministically, onto a unique respective "secondary" response Ri corresponding to the particular combination of Ci and Rw input to the transform function 502. The secondary challenge response pairs may be referred to herein as "secondary" in the sense that they are layered on top of the primary (base) CR pair, being generated in part based on the primary response Rw. They could also be called the "expanded layer" or "supplementary" challenges and responses.

In embodiments, the transform function 502 comprises a hash function, e.g. a cryptographic hash function such as a SHA or DSA hash function. There are at least two different ways a hash function can be used. In the first, the transform function 502 comprises a hash of a preimage, wherein the preimage comprises a combination (e.g. concatenation) of the received secondary challenge Ci and the generated primary response. I.e. $Ri=H(Ci\|Rw)$. Or more generally the preimage could comprise other elements as well, and/or another form of combination other than concatenation.

In the second, alternative approach, the transform function 502 comprises a hash of a preimage wherein the preimage comprises the received secondary challenge and the hash function is initialized with the generated primary response. I.e. $Ri=H(Ci)$ where H is initialized by Rw. Or again more generally the primage of H could comprise other elements as well, as long as it comprises at least Ci. Being initialized by Rw means that the mapping itself, of preimages to outputs defined by the hash function H, will depend on the Rw. Whereas in the previous case, the mapping of preimages to outputs caused by H does not depend on Rw, rather the preimage depends on Rw. I.e. in the previous paragraph, the preimage depends on Rw, and in this paragraph only H depends on Rw.

More generally still, in principle any function can be used as along as it deterministically and uniquely maps a combination of Ci and Rw onto a respective value of Ri, for each possible Ci in the domain to be accommodated by the ePUF 500.

The secondary challenge Ci can take any of a number of different possible values, and the transform function 502 will map them to respective values of the secondary response Ri based on the value of the particular received secondary challenge Ci and the value of the primary response Rw. Hence the ePUF 502 is capable of expanding the CR space of a given primary (base) CR pair to multiple secondary CR pairs. In embodiments Ci can take any arbitrary value within the range of values supported by the variable used (e.g. if it is a 32 bit integer it can take any of 2^32 values).

Figure 5B:
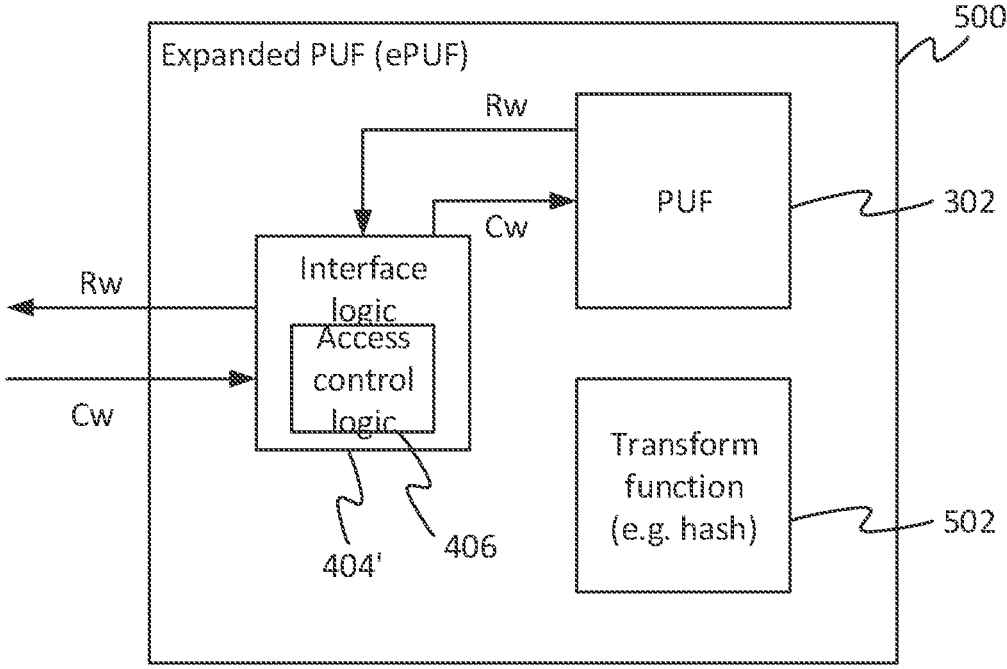
FIG. 5B is a schematic block diagram of the expanded PUF in a non-expanded mode of operation.

In some embodiments, the ePUF 500 may be capable of operating in an alternative mode of operation, as shown in FIG. 5B. In this case, the interface logic 404' detects that the input challenge data comprises only the primary challengee Cw. In response it routes the received value of Cw to the base PUF 302, and routes the resulting primary response Rw back to the device of the submitting party 103S. In other words in this embodiment, the ePUF 500 is also capable of operating in a "legacy" or "non-expanded" mode.

Optionally, depending on the application, the interface logic 404' may comprise access control logic 406 which restricts access to only a limited number of possible submitting parties 103S, such as by only granting access to a party that is able to present credentials (e.g. password, PIN or a biometric input) which it recognizes as being mapped to an authorized party. In this case the ePUF 500 could be considered as a form of CPUF. Alternatively the physical interface to the ePUF 500 could be legally or physically protected, such as by keeping the device comprising the ePUF 500 in a room or premises to which only a limited set of parties is permitted access, or keeping it in a locked box, cabinet or room. In this case the ePUF 500 could be considered like a kind of expanded weak PUF.

Alternatively or additionally to such physical restrictions on the interface to the PUF, access may also be restricted by restricting access to the primary challenge. E.g. the target party 103T ("Alice", discussed later) may be the only party who knows Cw.

As another alternative however, access to the interface logic 404' may not be restricted, e.g. any party may be free to query it via the Internet. In this case the ePUF 500 could be considered like a kind of strong PUF 502 created by expanding a weak base PUF mechanism.

The arrangement shown in FIG. 5A provides a new hybrid class of PUF device referred to herein as an expanded PUF (ePUF), which may be used generally as a framework for a number of applications, such as presented later.

An ePUF may be defined as a physical device or system, as shown in FIG. 5A, comprising the following three modules in conjunction: a base PUF 302 such as an inherently weak PUF; a transform function 502 such as a cryptographic hash function; and an interface logic module 404'. As discussed, an ePUF 500 may be 'expanded' relative to a regular PUF 302 by introducing a transform function 404' such as a cryptographic hash function, because it increases the size of the unique challenge space $\Phi_F$ from $|\Phi_F| \sim 1$ for the base weak PUF 302 to $|\Phi_F| >> 1$ that is bounded instead by the choice of hash function, rather than the physical system of the weak PUF.

The idea of realising a system that combines the large CRP space of a strong PUF with the practicability of a weak PUF, per se, has been explored previously. It is known to use multiple FPGA-based weak PUFs in combined operation to produce a system with the character of a strong PUF. The intention here is partly to 'expand' the CRP space of the base weak PUFs. However, the existing constructions of this nature are limited in practice. In the case of the FPGA design mentioned above, the system must be built on an FPGA and is still subject to a relatively low CRP space ($\sim 2^{10}$).

The ePUF design disclosed herein is designed to be extremely light-weight, in that it only requires the addition of an interface logic component 404' and a cryptographic hash function (or other such transform function) 502 to an existing weak PUF 302. For instance, if an SRAM PUF is chosen as a widely-used weak PUF 302, then the addition of the two remaining modules 404', 502 should not produce significant overhead, e.g. being implemented as a small algorithm in software (e.g. firmware) or a relatively simple piece of hardware circuitry. Moreover, the space of possible outputs of the ePUF 500 is expanded to the range of the chosen hash or transform function 502, which is considerably larger than the above. For instance, if the SHA-256 hash function is chosen, the space of possible outputs (and therefore CRPs) is increased to $2^{256}-1$ immediately, and there is no need to scale the hardware overhead farther than embedding the hash function module itself.

FIG. 5A shows the schematic design for an expanded PUF (ePUF) 500. The embodiments where a cryptographic hash function is used also mean that an ePUF 500 has the property that its CRPs are unpredictable, which is also the case for strong PUF systems.

The control logic element 406 of the ePUF device may also be generalised in this construction. The control logic 406 may be implemented simply as physical security, similar to an SRAM PUF, if this is appropriate to the application, for example.

Alternatively, the control logic module 406 may be implemented as a software control module similar to that used with CPUFs, where it is in fact embedded within the PUF device itself to provide the mutual security benefits of encapsulation discussed previously. However, a point here that differentiates the ePUF design from that of CPUFs in particular is that there is no strict requirement for the control logic to be implemented this way.

It need not necessarily be assumed that an invasive attack on the control module 406 necessarily alters the behaviour of the weak PUF component 302 in the ePUF design. Instead, the implementation of this element may be chosen on a case-by-case basis.

2.1. Challenges and Responses for ePUFs

The set of challenge-response pairs $(C, R) \in \Phi_F$ corresponding to an ePUF may be defined in the following way:

$$\Phi_F = \{(C_w, R_w), (C_1, R_1), (C_2, R_2), \dots, (C_N, R_N)\},$$

$$F : C_i \to R_i, \forall i \in (1, N)$$

$$F_w : C_w \to R_w$$

where $(C_w, R_w)$ is a privileged CRP corresponding to the base challenge-and-response of the weak PUF 302 and where the map $F_w$ is defined by the unique physical properties of the weak PUF. The pair $(C_w, R_w)$ may be referred to as the base or primary pair of the ePUF herein. The map F conversely is defined by the cryptographic hash function chosen for the ePUF. FIGS. 5A-B show extracting responses from an ePUF 500 where (FIG. 5B) the challenge is only Cw and (FIG. 5A) the challenge also comprises Ci.

In some embodiments of an expanded PUF, all challenges $C_i$, $i \in \{1, 2, \dots, N\}$ must be accompanied by the base challenge $C_w$, and the base response $R_w$ is incorporated in the process for generating all other responses $R_i$, as shown in FIG. 5A.

The process depicted in FIG. 5A for generating generic CRPs using an ePUF is designed to use the base challenge-response pair $(C_w, R_w)$ by expanding this base secret pairing by applying it to any other arbitrary challenge $C_i$. The algorithm used to generate CRPs from an ePUF may be tailored to a specific use, provided that the it makes use of the base pair $(C_w, R_w)$ in a deterministic way. A simple example of such an algorithm, denoted getResponse( ), can be written as follows. getResponse( ):

---

Inputs: Challenge
   1. Obtain challenge from user/client.
   2. Check challenge $= = C_w$?
     i. If yes:
       1. Probe weak PUF module with $C_w$ to obtain $R_w$
       2. Set Response $\leftarrow R_w$
     ii. If no:
       1. Separate Challenge into $C_w$ and $C_i$ components.
       2. Probe weak PUF module with $C_w$ to obtain $R_w$
       3. Send $C_i$ and $R_w$ to hash function module.
       4. Compute hash($C_i$, $R_w$, H)
       5. Set Response $\leftarrow$ hash($C_i$, $R_w$, H)
   3. Return Response
Outputs: Response

---

The function hash($C_i$, $R_w$, H) is a generic function that is used to compute a hash digest, using the cryptographic hash function H. The function hash( ) may be implemented in a number of ways, such as by simply computing $H(C_i\|R_w)$ in a simple case, or it could be implemented by taxing computing $H(C_i)_{R_w}$ where the value $R_w$ has been used as the initial vector of the hash function H. Either way, the output of hash( ) depends on both $C_i$ and $R_w$.

The diagrams in FIGS. 5A and 5B show that an ePUF 500 may be equipped with interface logic 404', optionally comprising a control logic module 406. In embodiments there are two possible paths to take in generating a response, where the path of FIG. 5B is used when the challenge is simply $C_w$, and the path of FIG. 5A is used when the challenge is a new value $C_i$ that is accompanied by $C_w$. This is deterministic.

The disclosed ePUF design may be used to provide any of the following advantages and/or others.

A large CRP space, defined by the domain and range of the chosen hash function.

Flexibility to separate control logic from the PUF itself.

The security primitives of a weak PUF.

This means that a user can use an ePUF device analogously to a CPUF device, but where the controlled access to the PUF includes both (I) securely storing the base CRP of the weak PUF $(C_w, R_w)$, and (II) restricting physical access to the PUF device to the intended user only. In this model, the base pair $(C_w, R_w)$ acts like a master key from which an extremely large number of other CRPs of the form $(C_i, R_i)$ may be derived, and where $C_i$ may be submitted by an external or third party.

2.2. Applications of an ePUF

The possible applications (use cases) of an ePUF device can be classified broadly into at least two main categories:

1. Linking identity to activities or computational operations; and

2. Acting as a key-generator for cryptographic operations.

Application (1) is most commonly implemented by existing strong PUFs, and (2) is most commonly by existing weak PUFs. The fact that the ePUF construction combines the properties of each means the ePUF may be treated as equally suited to either application. In application (1), an advantage is that one may implement such applications far more easily in practice using an ePUF generally than most strong or controlled PUFs.

3. IDENTITY LINKAGE SYSTEM

In this section, there is disclosed a generic framework for linking either human or machine identities to PUF devices.

Embodiments may use an expanded PUF (ePUF). The intention here is to formulate a PUF architecture that provides for a robust, yet highly generalised and flexible identity system, which can be repurposed for many different use cases. The properties we aim to capture in this construction are:

A large CRP space comparable to that of a strong PUF;

A practicality comparable to that of a weak PUF; and

A control logic that is more flexible than that of a CPUF.

The ePUF design may be used as the basis model for a PUF used in a range of identity-establishment protocols. Embodiments may allow for independence of the end user or machine in the process. Where existing schemes, which may also be repurposed to use an ePUF, rely on a trusted third party to directly access the PUF device during setup, ePUF-based proposed systems may allow the end user of a PUF device to instead establish an identity and participate in onward authentications without the need for the third party to access the device locally or directly during setup.

Some implementations may improve the robustness of and extend further these identity-linkage protocols by introducing a public blockchain. Two concepts that may be employed here are (A) the use of the blockchain as a tamper-proof CRP-management system, and (B) the use of a blockchain network as a time-stamping service for mediating request-response messages used in the identity-linkage protocols, and providing an efficient revocation system.

Figure 6:
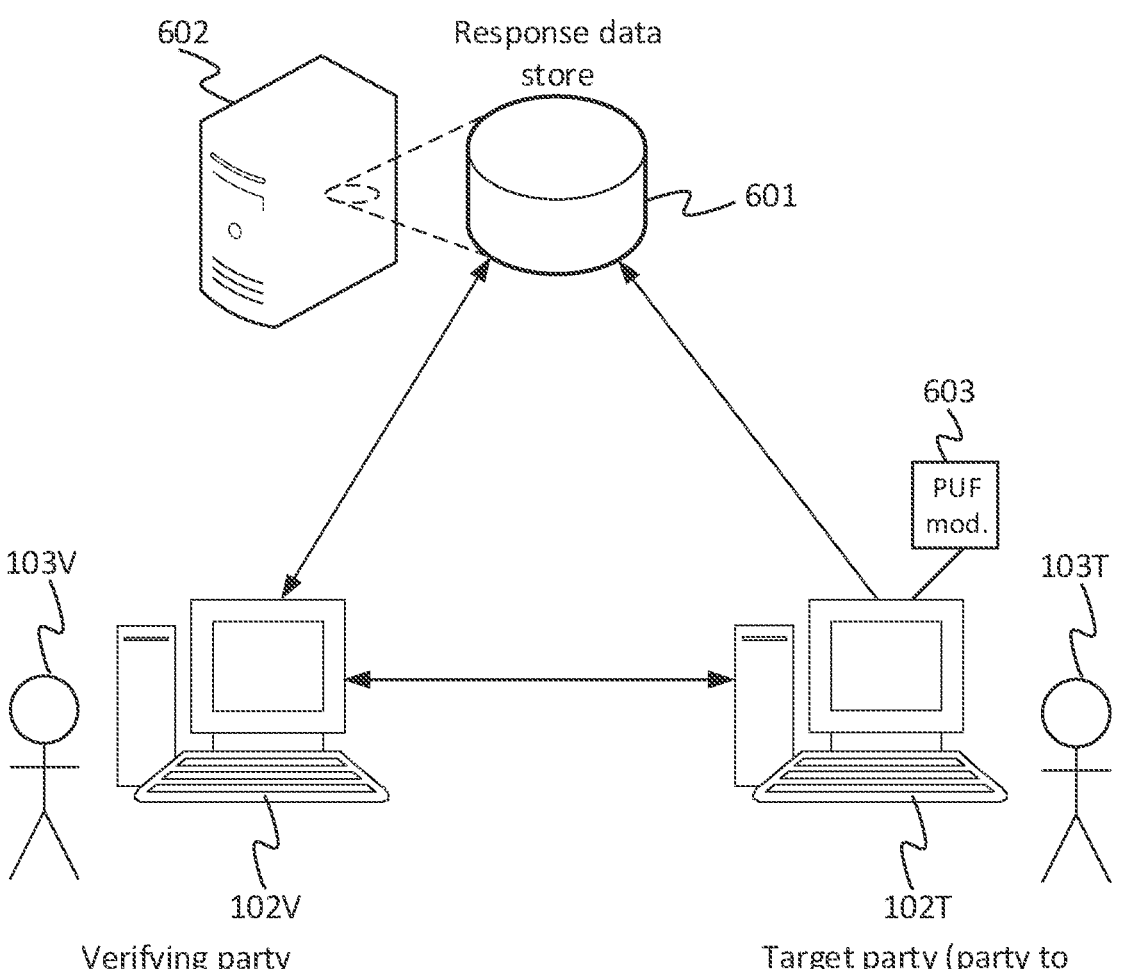
FIG. 6 is a schematic illustration of a system involving a trusted third party or publication medium in the distribution of challenge-response pairs.
Figure 7:
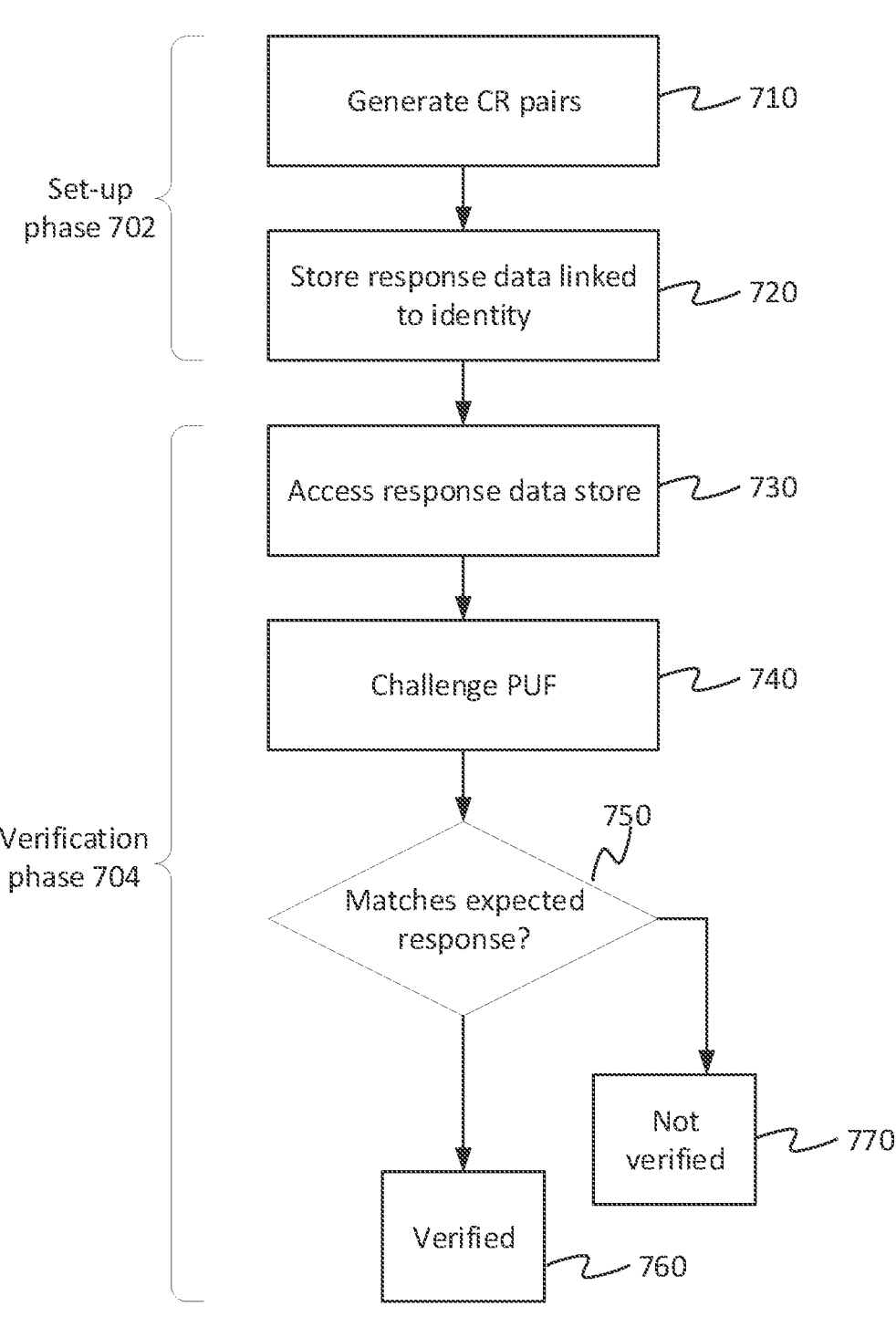
FIG. 7 is a schematic flow chart of a verification process in accordance with embodiments disclosed herein, FIGS. 8A-C schematically illustrate methods of generating a set of challenges from a master challenge in accordance with embodiments disclosed herein, and FIG. 9 schematically illustrates a method of recording response data on chain.

FIG. 6 shows an example system for identity linkage and verification in accordance with embodiments disclosed herein. FIG. 7 shows a corresponding method.

The system comprises a PUF module 603, computer equipment 102T of a target party 103T, and a response data store 601. The PUF module 603 comprises an ePUF 500 as described previously in relation to FIGS. 5A and 5B, or alternatively it may just comprise a conventional PUF 302 or PUF plus conventional interface logic 404 as described previously in relation to FIGS. 3 and 4. The response data store 601 could be part of third-party computer equipment 602 and administered by a trusted third party, or could instead be a distributed peer-to-peer storage medium such as a blockchain. The third party equipment 602 may for example comprise server equipment comprising one or more server units located at one or more geographic sites (cloud storage techniques are in themselves known in the art). The system may further comprise computer equipment 102V of a verifying party 103V, or in some alternative cases the verifying party may interact directly with the PUF module 603, target party's computer equipment 102T, or third party computer equipment 602.

Any reference herein to an action of a user or party 103, or such like—whether the verifying party 103V, target party 103T or a third party—covers the possibility that the party is acting through computer equipment 102 of that party. For conciseness this will not necessarily be stated explicitly each time, but it will be understood as implicitly covered. This covers both the possibilities that either A) the action is triggered by or performed under control of a manual user input by the party to the computer equipment, or B) the action is performed automatically by the computer equipment on behalf of the party (saying that a party performs an action does not necessarily mean that a human user of that party manually instigates that action, but could instead mean that the party's equipment performs that autonomously action on his/her behalf). For avoidance of doubt, note also that a party may refer to a single individual person or a group or people or organization, e.g. a company, a charity, a government body, or a municipal or academic institution.

The computer equipment 102T of the target party 103T may be operatively connected to the response data store 601 (e.g. by a connection to the third party equipment 602). The computer equipment 102V of the verifying party 103V may be operatively connected to the response data store 601 (e.g. by a connection to the third party equipment 602). The computer equipment 102T of the target party 103T may be operatively connected to the computer equipment 102V of the verifying party 103V. Any of these connections may be formed via one or more networks, e.g. one or more wide area networks such as the Internet or a mobile cellular network. In embodiments any of these connections may be formed via a respective secure channel, e.g. established based on a shared secret shared between the two parties in question. Wherever it is said herein that two parties communicate in any way, such as by sending a challenge or receiving back a response, etc., it will be understood that this covers the possibility that these communications may be performed via any suitable direct or network connection between their respective computer equipment (102V, 102T; 102T, 602; or 102V, 602). For the sake of conciseness this will not necessarily be stated explicitly each time, but it will be understood as implicitly covered.

The target party 103T is a party whose identity is to be verified based on the PUF module 603, or who owns or is otherwise responsible for or associated with a device to be verified based on the PUF module 603. The verifying party 103V is a party who is to perform the verification. There may be multiple verifying parties 103V (each of whom may act through respective computer equipment 102V), but for ease of illustration only one is shown in FIG. 6. The PUF module 603 may be in possession of the target party 103T. It may be incorporated into his/her computer equipment 103T, or connected to it, e.g. as a peripheral or via a local network, or a combination (e.g. the interface logic 404/404' could be implemented on the computer equipment 103T and the PUF 302 could be an external peripheral). Alternatively the PUF module 603 may be in the possession of the trusted third party. It may be incorporated in or connected to the third party computer equipment 602, e.g. as a peripheral or via a local network, or a combination (e.g. the interface logic 404/404' could be implemented on the third party equipment 602 and the PUF 302 could be an external peripheral).

In general any of the target party 103T, verifying party 103V or third party may take the role of the submitting party discussed previously in relation to FIGS. 3, 4 and 5. Any of the target party 103T, verifying party 103V or third party may take the role of the submitting party, or may take the role of a setting-up party using the PUF module 603 to establish a set of one or more CR pairs and link them to an identity of the target party 103T for use in a later verification phase. Some specific example scenarios are discussed in more detail later.

The response data store 601 stores response data that was generated by the PUF module 603 in a set-up phase. The data store 601 stores this response data in association with evidence of an identity of a target, which may be the target party 103T or a device of the target party 103T. The verifying party 103V has access to the response data store 601 and can use this to verify the identity of the target at a later time during a verification phase. To do this the verifying party 103V challenges the target to produce a response Ri to a challenge Ci that was previously included in the set of challenges used in the set-up phase. If the target can produce the expected response according to what is stored in the response data store 601, then this evidences that the target is in possession or control of the PUF module 603, and thus may be assumed to be the same party whose identity was captured in the set-up phase.

In an alternative variant, the response data store 601 may store one or more public keys of one or more respective public-private key pairs that were generated based on the response(s) produced in the set-up phase, e.g. using the response as a seed. If the target later signs a message (e.g. a document or blockchain transaction) using one of the private keys, the verifying party can verify the signature using the corresponding public key from the response data store 601. Note that in such variants, the term "response data" is being used in a broader sense to cover data derived from the response Ri, not necessarily the explicit value or an attestation of the response Ri.

The response data store 601 may be publicly accessible, or access may be restricted to only a limited set of one or more parties including at least one verifying party 103V. It may be hosted on a third party system 602 or in a peer-to-peer manner, or alternatively it may be implemented in the computer equipment 102T of the target party 103T or the computer equipment 102V of the verifying party 103V.

Referring to FIG. 7, the method comprises two phases: a set-up phase 702 and a verification phase 704. In the set-up phase, at step 710 one of the target party 103T or third party, acting as a setting-up party, submits a set of one or more challenges Ci (i=1 . . . n, where n>=1) into the PUF module 603. These are the secondary challenges in the case where an ePUF 500 is used. In the case where the target party 103T has possession of the PUF module 603 and is performing the set-up, the challenges Ci could be generated by the target party 103T or received from the third party system 602 or verifying party 103V. In the case where the third party has possession of the PUF module 603 and is performing set-up, the challenges could be generated by the third party system 602 or received from the target party 103T or verifying party 103V. Either way, in response the PUF module 603 generates a corresponding set of responses Ri based on the PUF 302/500. These are the secondary responses in the case of an ePUF 500. There method thus generates a set of CR pairs {Ci, Ri}.

In embodiments, access to the PUF module 903 is restricted such that only the target party 103T (and the setting-party if a different party) can gain access to the responses Ri. This could be achieved by access control logic 404 or 404' which may only grant access to a party who can present recognized credentials such as a password, PIN, biometric data, etc. And/or access to the physical interface to the PUF module 603 may be physically protected, such as by keeping it in a locked container, cabinet or room; or it may be legally protected such as by storing the PUF module 603 in a room or complex to which only certain personnel are permitted access. As another alternative or additional restriction, in the case of an ePUF 501, knowledge of the primary challenge Cw may be restricted, such that only the target party 103T (and in embodiments a trusted third party acting as a separate setting-up party) knows Cw.

At step 720, the method comprises storing response data in the response data store 601. In embodiments the stored response data comprises a record of the generated CR pairs {Ci, Ri}. The record of each CR pair comprises a record of the respective response Ri stored in a manner that indicates the corresponding challenge Ci of the pair. In embodiments the stored record of each response Ri comprises an explicit value of the response, i.e. the actual value of Ri, explicitly disclosed to a verifying party 103V who can read the records. The value could be stored in the clear or could be encrypted if the verifying party has the decryption key to decrypt the value, but nonetheless the stored value is still said to be the explicit value for the purposes herein in the sense that it is explicitly disclosed to the verifying party 103V. Alternatively the record of the response could comprise an "attestation" of the response Ri, comprising a deterministic transform of Ri. An example would be to store the value of a hash H(Ri) or double hash H²(Ri). This enables the verifying party to check whether a value of the response R'i is the same as that recorded in the store by checking whether the same transform applied to R'i (e.g. H(R'i) or H2(R'i)) matches the attestation. This has the benefit that the actual value of the response Ri is not disclosed. Therefore this variant of the method can be particularly useful where the store 601 is a public medium such as a blockchain. However encryption would be another possibility.

Where the response data is stored in encrypted form, then each piece of response data (e.g. each CR pair) may be encrypted individually, each requiring a different respective decryption key to decrypt. Alternatively subsets or the whole set of response data (e.g. all CR pairs for a given target party 103T) could be encrypted together, all being decryptable together as a group with the same key.

The response data, e.g. the CR pairs, are stored in the response data store 601 in association with evidence of the identity of the target. For example the target party 103T may be required to produce one or more pieces of identification information, such as a passport, as part of the set-up. The evidence held in the response data store 601 in association with the response data could comprise a copy of this information itself being stored explicitly in association with the response data (either in the clear or in encrypted form accessible to the verifying party 103). Alternatively, if the response data store 601 is administered by a trusted third party or the verifying party 103V themselves, then the mere fact of the response data being registered in the repose data store 601 in association with a particular identity could be considered sufficient evidence (the assumption being that the verifying party 103V trusts the setting-up party and the party administering the response data store 601, e.g. the trusted third party, to have suitably checked the target party's identification information upon set-up).

In the verification phase 704, at step 730 the verifying party 103V accesses the response data store to determine the response data to use in a verification operation. In embodiments, there are a plurality of potential verifying parties 103V, and each is allocated a different respective subset of one or more of the CR pairs. I.e. the response data store 601 will only disclose, to a given verifying party 103V, the expected response(s) Ri of the CR pair(s) allocated to that party. E.g. this scheme may be administered by the trusted third party system 602. Such a scheme advantageously keeps the CR pairs separate, such that one verifying party 103V cannot pretend to another to be the target. However if all the verifying parties 103V given access to the store 601 are trusted then this is not essential.

In embodiments, the verifying party 103V does not initially know the challenge that he/she is going to use, and determines this by accessing it from the data store 601 along with the corresponding response data (e.g. response or attestation). Alternatively the verifying party 103V does know in advance which challenge he/she intends to use, and uses this to look up which response data is mapped to this in the data store 601.

In a scenario where the verifying party 103V (or indeed any party) accesses data from a blockchain, such as to determine the response data and/or challenge, then accessing the blockchain may be performed either by directly querying a node of the blockchain network, or indirectly by querying an intermediate service that caches blockchain data or mediates queries on behalf of parties seeking access to blockchain data. E.g. the verifier 103V could access the data from another service provider who is not directly connected to the blockchain network 106, but might just give the response-related data, and perhaps also a Merkle proof.

At step 740, the verifying party 103V submits a challenge Ci to the target party 103T, who is in possession or control of the PUF module 603. This is a challenge corresponding to one of the records which the verifying party 103V accessed from the response data store 601 in step 730. Note that in the scenarios where the trusted third party was in possession of the PUF module 603 at set-up, the PUF module 603 may be physically passed from the trusted third party to the target party 103T between the set-up phase 702 and verification phase 704.

In response to the submitted challenge Ci, the PUF module 603 generates the corresponding response Ri, which the target party 103V returns to the verifying party. At step 750 the verifying party checks whether the received response Ri is consistent with the response expected according to the response data that was accessed from the response data store 601 at step 730.

As mentioned, the party performing the set-up steps 702 could be the target party 103T or a trusted third party who stores the response data (e.g. CR-pairs). In further variants, these steps could be performed by another, coordinating party such as a trusted oracle (another third party other than the party who, in embodiments, runs the third party computer equipment 602 comprising the data store 610). In such embodiments the data store 601 could be the third-party system 602 (of a different third party) or a public peer-to-peer medium such as a blockchain. And/or in yet further variants, there could be provided a separation between the party that performs the inputs to the PUF module 603 and the party that receives the outputs.

As also mentioned, there are at least two possibilities for the manner in which the response Ri is recorded in the response data store 601. This first is simply to explicitly store the actual value of Ri itself. In this case step 750 simply comprises comparing the stored value (which was established at set-up 702) with the value R'i (the purported value of the response Ri) now received in response to the submitted challenge Ci (in the verification phase 704). If they match, then the method branches to step 760 where the identity of the target party 103T is declared verified. Otherwise the method branches to step 770 where the identity of the target party 103T is declared not verified.

The second possibility is that only an attestation of Ri is stored in the response data store 601, e.g. a hash or double hash. In this case, the verifying party 103V applies the same transformation that was used to generate the attestation to the response R'i that he/she received back from the target party 103T in the verification phase 704. If this matches the stored attestation, then the method branches to step 760 where the identity of the target party 103T is declared verified. Otherwise the method branches to step 770 where the identity of the target party 103T is declared not verified.

In the response data store 601, there are at least two possibilities for the manner in which the corresponding challenge Ci is indicated as being associated with each recorded response Ri. The first is simply to store an explicit value of each CR pair {Ci, Ri}, i.e. to store the actual values of Ri and Ci (either in the clear or encrypted). Alternatively, a second, more lightweight way, in accordance with embodiments disclosed herein, is to store a master challenge Cm from which the challenges Ci can be derived according to a predetermined, deterministic challenge-derivation function f.

Figure 8A:
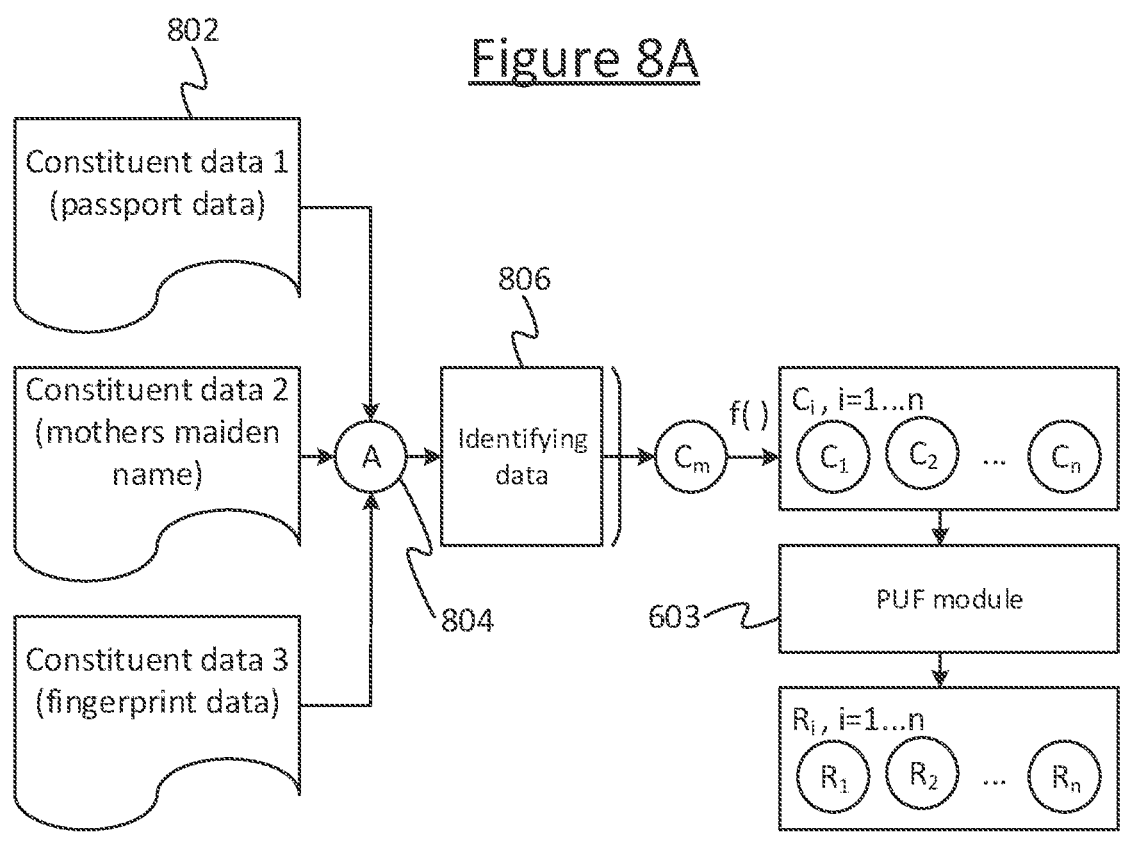

This is illustrated in FIG. 8A. Each response Ri is stored in association with a respective index. The function f is either stored in the response data store 601 or is pre-known to the verifying party 103V. Either way, the verifying party 103V inputs the master challenge Cm into the function f to determine the challenge Ci corresponding to the index i of at least one of the responses Ri. The verifying party 103V then uses this challenge Ci to verify the target.

In some such embodiments, the function f may also be a function of identification information 806, which may be a single piece of identification information or a combination 804 (e.g. a concatenation) of a plurality of pieces of identification information 802 (e.g. passport info, mother's maiden name and fingerprint info). This may comprise identification information of the target party 103T. This enables a set of challenges Ci specific to the particular target party 103T, which is advantageous for security reasons as uniqueness may be important, for instance if the same third party system 602 is used to generate challenge sets for different target parties. Using personal identification information such as passport information or mother's maiden name of the target party 103T is a good option since it is something he/she already knows of has, and tends to keep private.

Alternatively or additionally, the identification information 806 may comprise identification information of the verifying party 103V, such that f is a function of the identity of the particular verifying party 103V. This could be used to allocate a particular subset of one or more particular challenges to a particular verifying party 103V, such that different verifying parties 103V are given different challenges Ci to use in the verification 704.

Figure 8B:

In some embodiments, regardless of how the master challenge Cm is formed, the challenges Ci may be mapped to the master challenge Cm in a chained manner, such that the C1=f(Cm), C2=f(C1), etc., as shown in FIG. 8B. In other words a first challenge C1 is determined by applying the function f to the master challenge Cm, and then the second challenge C2 is determined by applying the same function f to the first challenge, and so forth. As an example, f may comprise a hash function.

Figure 8C:
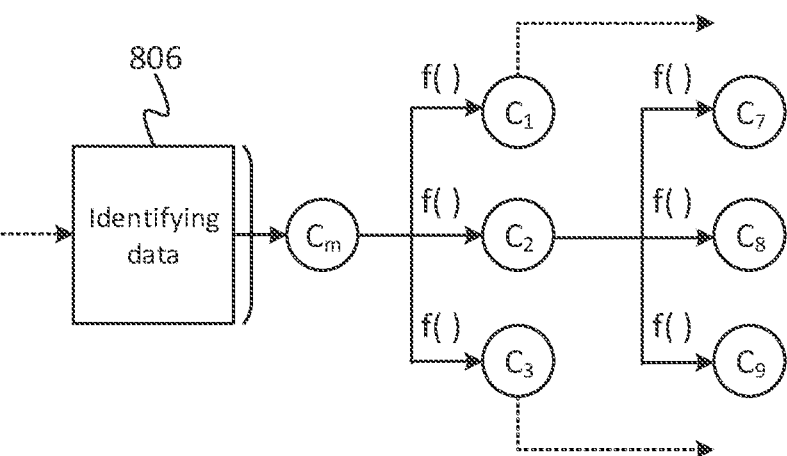

In another variant, the challenges Ci may be mapped to the master challenge Cm in a hierarchical manner, as shown in FIG. 8C. This will be discussed in more detail later.

The chained approach is more lightweight and also easier to recover from the root information if f( ) does not require any data other than the root key. In the case of the hierarchical derivation, the indices in the tree would be added in, which would not be needed for a simple chain like this: C_m, H(C_m), H(H(C_m)) . . . , e.g. where f( ) is just a hash function.

Regardless of the form of f( ), or whether the master challenge comprises identification information and/or other information, in embodiments the master challenge Cm may be received by the third party system 602 from the target party 103T during set-up 702. The third party then stores the received master challenge in the data store 601 (e.g. either locally or on chain), for future use in verification 704. Alternatively the third party system 602 receives the set of challenges Ci from the target party 103T, and derives the master challenge Cm therefrom, e.g. by applying an inverse of the function f( ). In variants of these approaches, the third party system 602 may receive the identification information, master challenge or set of challenges from elsewhere other than from the target party 103T, e.g. from an oracle or coordinating party (not shown). A combination of such approaches could also be used (e.g. one piece of identification information being received from the target party and one being obtained from elsewhere). Or in further alternatives, a third party is not involved and the target party 103T stores the master challenge on chain him/herself (or in some other peer-to-peer publication medium).

In further variants of the method of FIG. 7, the response data stored in the response data store 601 may not comprise a record of the CR pair(s) generated at set-up. Instead, the response data may comprise a public key of a public-private key pair, or a set of such public keys, wherein each of the one or more key pairs was generated based on a respective PUF response Ri from the set-up phase 702. E.g. the response Ri may be used as a seed in a public-private key-pair generation algorithm. In such embodiments, the method proceeds as set out in FIG. 7, except that at step 730 the verifying party accesses one of the stored public keys, and at step 740 the verifying party 103V does not submit a challenge Ci to be input to the PUF module 603 of the target. Instead, the verifying 103V party obtains a message (e.g. document, file, or part of a blockchain transaction) that was (purportedly) signed by the target. This message could be sent to him/her by the target party 103T, or the verifying party 103V could access it autonomously from a publication medium such as a blockchain or website. Either way, at step 750, the check comprises using the public key accessed from the store 601 to verify the signature applied to the message (based on known public-private key signature verification techniques which are, in themselves, well known in the art).

The following now describes some example identity-establishment and verification protocols for ePUFs or PUFs more generally in accordance with embodiments disclosed herein. Consider a prover Alice (target party 103T) and verifier Bob (verifying party 103V).

There are at least three different challenge types in a PUF identity system. By way of example the below will be described in terms of an ePUF, but more generally any PUF device could be used (any device comprising a PUF module 603).

1. Remote PUF challenge—The verifier challenges the prover remotely, by requesting a response from Alice to a challenge submitted by Bob. This mode assumes that the verifier knows an expected response(s) from the prover's PUF, and also that the PUF is possessed by the legitimate owner.

2. Local PUF challenge—The verifier challenges the prover locally, by interacting with the PUF device controlled by Alice. This mode assumes the verifier knows something about the prover's identity, but nothing about the behaviour of their PUF.

3. Cryptographic challenge—The verifier challenges the prover to satisfy some cryptographic requirement related to her identity, such as by signing a message with a key that is provably linked to a certified public key.

In the case of types 1 and 2, the challenge is explicitly dependent on the PUF module 603 from both the prover and verifier's perspectives. The challenge, and thus the corresponding verification process, in these cases is intrinsically linked to the operation of the PUF device (the device comprising the PUF module 603, e.g. Alice's computer equipment 102T). In these cases, we are using the property of PUF devices that their physical state can be uniquely bound to an identity, and the PUF therefore plays a central role in the identity system being utilised.

Note that the terms 'remote' and 'local' refer specifically to the interaction between the verifier and the prover's PUF at the time of making a challenge. This does not preclude a remote challenge protocol from having a setup phase that involves a local interaction between the prover and verifier ahead of time.

In case 3 however, the challenge and verification process need only be related to a PUF device from the perspective of the prover. The verification is not dependent on the verifier knowing whether or not a PUF has been used by the prover in generating the response to their challenge. In this case, the method is simply using the utility of a PUF as a key-generator for Alice, rather than for its utility in linking identity to the device itself.

In the following, example implementations are provided for the setup and verification, and optional update, and revocation processes, for identity systems in each of the three modes of operation mentioned above. In embodiments a generic trusted third party is involved in the processes relating to a PUF-based identity system. This is because such identity systems tend to require such a third party in order to meaningfully assure integrity and trust in identity and related credentials. In the case where an individual's identity is to be established and used in such a system, the trusted third party in question may be a certificate authority, government agent, or a financial services provider such as a bank.

In the case where an identity is to be established for a machine or non-human entity, the third party may be a device manufacturer, issuer, regulator, or some other relevant actor.

This case is particularly suited to an internet of things (IoT) or further a blockchain of things (BoT) paradigm, where identity is to be assigned to different members of a network of devices which may perform tasks or calculations cooperatively to achieve some goal.

3.1. Remote PUF System 3.1.1. Setup: In the case of remote PUF challenges, assume that the verifier that submits a challenge C to the prover knows the expected response R ahead of time. This means that the setup process in this case must establish a set of CRPs (i.e. at least one) between Alice and another party that can be used to derive a shared secret between them that can be used to authenticate Alice's identity at a later time.

Assume that Alice establishes this shared secret with the generic third party equipped to establish the identity, as mentioned previously, and this third party may or may not be the verifying party that participates in a verification process with Alice later. In the case where the verifying party is distinct from the identity-establishing third party, assume that the verifying party may obtain the relevant CRP information used for the shared secret(s) from the third party.

There are two distinct options for the setup phase here, categorised by whether Alice is the sole party with access to the PUF device at all times, or whether the trusted third party may also have access to the PUF device during setup phase only.

Case 1: Alice has sole access to PUF

1. The ePUF device is manufactured and distributed to Alice.
2. Alice applies to link her identity to her ePUF device by contacting a trusted third party.
   i. The third party establishes an identification account for Alice, and requests proof of her identity.
   ii. Alice supplies the third party with the relevant identification documents or credentials.
   iii. The third party verifies Alice's identity.
3. Alice and the third party establish a secure communication channel for the rest of the setup process (e.g. via standard Diffie-Hellman key exchange):
   i. Alice and the third party exchange public keys $P_A$, $P_T$ respectively.
   ii. Alice and the third party independently establish an ephemeral secret for the remaining setup communications as $S = S_A \cdot P_T = P_A \cdot S_T$.
   iii. Alice and the third party begin communicating over a channel, e.g. an AES-encrypted channel, secured by S.
4. The third party sends Alice a set of challenges $C_1$, $C_2$, . . . , $C_n$ over the secure channel.
5. Alice obtains the responses $R_1$, $R_2$, . . . , $R_n$ from the ePUF device.
6. Alice sends the third party the responses $R_1$, $R_2$, . . . , R, over the secure channel.
7. The third party stores the responses CRP set $\{(C_1, R_1), (C_2, R_2), . . . , (C_n, R_n)\}$ against Alice's identity account.

Case 2: Third Party Accesses PUF During Setup

1. The third party has the knowledge of the base pair and the hash function. E.g. the ePUF device is manufactured and distributed to the trusted third party*.

(* The device may be first distributed to Alice, and then sent by Alice. However, in most cases it will make more sense for the device to be distributed directly to the third party. E.g. if the device is a smart debit card, the card may be sent from manufacturer to the issuing bank, and then from the issuing bank to the customer Alice, following the PUF setup.)

2. The third party obtains the base CRP $(C_w, R_w)$ from the device.
3. Alice applies for an identity-linked ePUF device by contacting the third party. This may be done over an unsecured communications channel.
   i. The third party establishes an identification account for Alice, and requests proof of her identity.
   ii. Alice supplies the third party with the relevant identification documents or credentials.
   iii. The third party verifies Alice's identity and assigns the ePUF device and its base pair $(C_w, R_w)$ to Alice's account. The shared secret is, or is a derivative of, this CRP.
4. The third party sends the ePUF device to Alice.

The setup protocol establishes a shared secret(s) between Alice and the trusted third party to be used to authenticate Alice's identity (or PUF-containing device) at a later time during a verification process. The cases are also similar in that they both preferably involve secure communication between Alice and the trusted third party.

However, a distinction between the two cases is that case 1 achieves the secure communication by establishing a secure communication channel, whereas case 2 achieves it by means of physical security.

Another difference to note between the two protocols in case 1 and 2 respectively, is that in case 2 the trusted third party can derive as many CRPs without the PUF as Alice, while in case 1 this party has to store a fixed number of pairs.

This is an advantage of case 2 over existing protocols for setting up a user with a PUF device because it allows the trusted third party to generate an arbitrary number of CRPs remotely, whereas in existing protocols the trusted third party may need to cooperate with either the end user or device manufacturer to do so. The same technical advantage may be achieved in case 1 if the step is added of Alice sending the base pair $(C_w, R_w)$ to Bob over a secure channel (trusting the third party not to use the base pair in a malicious way).

Note that the use of secure communication in the setup phase allows for future communications, such as the verification process, to be transmitted over unsecured channels. This has the benefit of allowing verifications to occur with fewer technical limitations, such as the need for both parties to be online at the time of verification, and only requires the additional secure communications overhead in this one-time setup process.

3.1.2. Verification: In the mode of remote PUF verification, recall that there were two distinct cases in the setup phase, which are reflected in slightly differing remote verification protocols, as detailed below.

Case 1: Alice has sole access to PUF

1. Bob obtains an unused CRP, such as $(C_1, R_1)$, from the set $\{(C_1, R_1), (C_2, R_2), \ldots, (C_n, R_n)\}$ established by Alice and the third-party during setup.
   i. If Bob is also the trusted third party, he simply retrieves an element from the set.
   ii. If Bob is not the trusted third party, he communicates with the third party by requesting an unused CRP for Alice.
2. Bob sends the challenge $C_1$ to Alice.
3. Alice obtains the candidate response $$R'_1$$

from her ePUF device and sends it to Bob.
4. Bob verifies whether $$R'_1 == R_1:$$

i. If yes, the verification passes.
   ii. If no, the verification fails.
5. The pair $(C_1, R_1)$ is subsequently removed by the trusted third party, leaving the set of remaining challenge-response pairs $\{(C_2, R_2), (C_3, R_3), \ldots, (C_n, R_n))\}$.

Note that in step 1.ii. the single-use nature of the CRPs ensures that it is not possible for an arbitrary Bob to 'impersonate' Alice using a particular CRP, because the trusted third-party can simply monitor the use of each pair in each given situation and should use a fresh CRP for every authentication attempt.

Case 2: Third party accessed PUF during setup

1. Bob generates a fresh challenge C for the verification. This may be done randomly, or deterministically from some other data (e.g. known KYC data, biometrics, images).
2. Bob sends the challenge C to Alice.

3. Alice obtains the candidate response R' from her ePUF device and sends it to Bob.
4. Bob obtains the expected response R.
   i. If Bob is the trusted third party, he is able to calculate the response directly by computing R=hash(C, $R_w$, H)*.

(* This is because the third party obtained the base pair $(C_w, R_w)$ during setup protocol (case 2) which implies that R, is known to them. It is also assumed that the has function H is known to at least the third party, if not everybody, i.e. is a public standard such as SHA-256).

ii. If Bob is not the trusted third party, he sends C to the third party and requests the response R.
5. Bob verifies whether R'==R:
   i. If yes, the verification passes.
   ii. If no, the verification fails.

3.1.3. Update: It may also be desirable to specify a process for Alice and the third party to establish fresh CRPs given their single-use nature in verification (and other useful protocols, such as logins).

Case 1: Alice has sole access to PUF. In this case, another secure channel is established to transmit challenges and responses between Alice and the third party, as in the setup. We assume that Alice has at least one remaining CRP of the form $(C_i, R_i)$ to establish a shared secret of the form $S=H(R_i)$ or similar, or has access to a previous shared secret $S=S_A \cdot P_T = P_A \cdot S_T$ from DH key-exchange.

1. Alice and the third party establish a secure communication channel using a shared secret S. This can be derived in many ways, the protocol is agnostic to this.
2. The third party sends Alice a set of challenges $C_1, C_2, \ldots, C_n$ over the secure channel.
3. Alice obtains the responses $R_1, R_2, \ldots, R_n$ from the ePUF device.
4. Alice sends the third party the responses $R_1, R_2, \ldots, R_n$ over the secure channel.
5. The third party stores the responses CRP set $\{(C_1, R_1), (C_2, R_2), \ldots, (C_n, R_n)\}$ against Alice's identity account.

Note that steps 2-5 at least are identical to the setup steps 4-7.

See also the previous comment regarding Alice telling third party $(C_w, R_w)$ over the channel.

Case 2: Third party accessed PUF during setup. In this case, the third party can generate an arbitrary number of CRPs indirectly, because they have knowledge of both the base pair $(C_w, R_w)$ and the hash function H( ). This means that there is no requirement for an interactive update in this case.

3.1.4. Revocation: a further part of the identity system may be for a particular ePUF device to be revoked, such that is it no longer used for identity purposes. The revocation process is simple and can be performed as either (i) a revocation by the third party, independently of the user Alice, or (ii) a revocation by Alice conveyed as a revocation request.

The first case does not require any technological means involving ePUFs or otherwise. The second case does not require a protocol or solution specific to ePUFs, because a good example of the need for a revocation in the first case is if Alice has lost the physical device containing the ePUF, or if it has been compromised in some way.

However, if it is desired to optionally leverage the ePUF in a revocation process, wherein Alice still has physical control of the device, then it may be prescribed that Alice's request is authenticated using one of the CRPs she and the third party have established (or derived shared secret thereof) such as by means of an HMAC or an encrypted message using a CRP response or secret as the key in each case. For the reason mentioned above, however, this is not considered a strict requirement of the system by any means.

3.2. Local PUF System 3.2.1. Setup: the setup that can be employed for the local PUF is exactly the same as the setup for the remote PUF, but a difference between the local and remote cases is how the verification step is carried out below.

3.2.2. Verification: In this scenario, a verification is being performed locally. This means that the verification process requires that both the prover (Alice) and verifier (Bob) are in the same physical location.

This scenario may be relevant for example to court proceedings (for human identity), where Alice is legally required to interact with an investigation locally using her ePUF device, or where an analysis of an IoT system is to be performed (for device identity) where an administrator of a system may wish to explicitly check the response of a particular device locally. It may also be relevant to payment scenarios.

Other scenarios to which such a process is applicable could include diagnostics on a vehicle after a crash, where the authorities wish to determine exactly which digital component issued an instruction. In this case, the input C may be some environmental or dynamics conditions, and the response R would be part of the instruction that was given by the device.

A distinction between the local PUF verification protocol, outlined below, and the previous remote PUF verification protocols is that this local protocol does not assume the verifier has knowledge of the ePUF's response ahead of time. In other words, the response generated during the local verification process is not available to the verifier ahead of time. It is likely in this scenario, however, that the challenge used in the verification process is meaningful in some way. For example, consider a machine whose identity can be considered to be the base pair $(C_w, R_w)$ of its embedded ePUF component. The verification process may be performed to verify that it was this particular device that previously yielded an output R from a given input C.

1. Bob obtains the relevant challenge C to submit to the ePUF device, based on the CRP in question (C, R).
2. Bob gains access to the ePUF device.
3. Bob uses the ePUF device to generate the candidate response R'=hash(C, $R_w$, H).
4. Bob verifies whether R'==R:
   i. If yes, the verification passes.
   ii. If no, the verification fails.

In these scenarios Bob does not know the candidate response R' ahead of time, but rather is verifying that the response he now receives from the PUF device matches a previously generated response. For instance this can be used to verify (e.g. in court) that a person (Alice) or a device that prevails produced a response is the same person or device that is now present (e.g. in the court). E.g. in the example of the digital component, this would have been configured to issue the instruction upon generation of R based on some input challenge C. E.g. if the device is a self-driving car and the component receives a challenge derived from or comprising the data "the car in front is too close" then the response R is generated, and R triggers the component to issue the instruction to apply the brakes. So in the retrospective diagnostic verification, the verifier believes the car slowed down and wishes to verify that the conditions were actually that "the car in front was too close" to trigger that response.

3.2.3. Update: The process for generating updated CRPs can follow the same logic as put forward for the remote case, as the key difference in that scenario only applies to verification.

3.2.4 Revocation: the same techniques described for remote revocation in are also valid here.

3.3. Cryptographic PUF System 3.3.1 Setup: In this case, Alice establishes an identity with a third party using standard cryptographic means, but using an ePUF device in the process.

In this scenario, the third party may optionally have knowledge that an ePUF has been used in the process. Similarly, for an identity established in this manner, the verifier of an identity may or may not know that an ePUF device is involved in the identity verification process. In short, the following protocol only stipulates that the owner of the device, Alice, has knowledge that an ePUF device is involved in the identity system.

1. The ePUF device is manufactured and distributed to Alice.
2. Alice applies to establish a cryptographic identity by contacting a trusted third party.
   i. The third party establishes an identification account for Alice, and requests proof of her identity.
   ii. Alice supplies the third party with the relevant identification documents or credentials.
   iii. The third party verifies Alice's identity.
3. Alice chooses a cryptographic method for establishing a cryptographic link to her identity, e.g. establishing a certified asymmetric key-pair using her CRP.
   i. The third party obtains a public key $P_A$ from Alice, where $P_A = s_A \cdot G$ is an EC key pair.
   ii. The third party requests that Alice signs (e.g. via ECDSA) a message m using the private key $s_A$.
   iii. Alice generates the ECDSA signature $Sig(P_A, m)$ and sends to the third party.
   iv. The third party verifies the signature.
4. If the signature is valid, the third party certifies the key $P_A$ against Alice's identity.

Step 3 involves using a cryptographic scheme of the user's choice, but that we assume the relevant key involve in the process will be a derivative of a CRP response known only to Alice. In the example chosen above, this means that the private key $S_A$ would be derived from a particular ePUF response R, such as $S_A = H(R)$.

3.3.2 Verification: In the cryptographic case, the identity verification is performed using cryptographic information that was established during the cryptographic setup phase detailed previously. In this case, we take the example that a certified EC asymmetric key-pair was established against Alice's identity during setup, and we now use that key for verification.

The protocol below could, however, be simply adapted for any other cryptographic scheme simply by substituting the existing setup and verification protocols for those schemes where appropriate. A difference here is using an ePUF device as a secure key-generator for the setup and verification process, which reduce the risk of malicious compromise to the holder Alice.

1. Bob obtains the identity-linked information $P_A$, e.g. a certified key.
   i. If Bob is the trusted third party, he simply retrieves $P_A$ from Alice's account.
   ii. If Bob is not the trusted third party, he communicates with the third party and requests a certified public key for Alice.

2. Bob chooses a message m for Alice to sign, and sends to Alice.
3. Alice generates a signature over the message m.
    i. If Alice wishes to sign with her certified key, she generates the signature $Sig(P_A, n)$.
    ii. If Alice wishes to sign with a single-use derived key, she generates the signature $Sig(P_\alpha, m)$, where $P_\alpha = P_A + H(d) \cdot G$ and d is some single-use data*.
        (* This data may be related to the verification, such as an invoice message, or biometric fuzzy-matching data. The data d may be chosen by Bob or Alice. Alternatively, d may be a shared secret known to Alice and Bob e.g. derived using Diffie-Hellman key exchange and/or an HMAC.)
4. Alice sends the signature to Bob. At this point, Alice may also send the data d if Bob does not already know it.
5. Bob verifies the signature against the public key using $P_A$ (and d, if applicable).
    i. If the signature verification passes, the identity verification passes.
    ii. If the signature verification fails, the identity verification fails.

The cryptographic verification process above may also apply to an identity established independently, as described in the previous section, if the identity was established with a similar cryptographic primitive such as an EC or PGP key.

3.3.3. Update: the process of updating Alice's identity here is not dependent on the use of the ePUF device in key-generation, and as such it is not necessary to prescribe any particular method here. Instead, standard methods for updating a certified key such as $P_A$ may be used.

It may simply be assumed that the ePUF will be involved in key-generation for any required signatures or other cryptographic process required by the existing process(es).

3.3.4. Revocation: Similarly, it is not necessary to prescribe a particular revocation protocol here, but defer to standard mechanisms. Once more, it may be assumed that the ePUF will be involved in the background as a key-generator for the relevant cryptographic operations.

3.4. Independent PUF Mechanism 3.4.1 Setup: In the independent case for establishing an identity using an ePUF device, consider the scenario where an entity wishes to establish either a human identity independently of any third party, or a device identity within a closed system. The only party involved in this process is Alice, the 'owner' of the ePUF device and the eventual prover during later verifications.

Case 1: Alice establishes human identity
1. Alice obtains an ePUF device.
2. Alice probes the ePUF with a challenge C.
3. Alice obtains the response R from the ePUF.
4. Alice uses the pair (C, R) to establish an identity for herself:
    i. Alice may use a cryptographic setup to establish a non-certified identity key $P_A$.
    ii. Alice publishes her identity key against her identity.
5. Alice may wish to publish attestations to her CRP, such as the double-hash $H^2(R)$ of the response.

This case, where Alice establishes a 'self-sovereign' identity for herself, is useful to an extent in providing a unique and reproducible device identifier for a device that only she controls. However, the lack of a trusted third party in such an identity system means that a verifier must later trust the link between the prover's identity and the prover's device. This may have very limited applications in the real world.

Case 2: Alice established identity for a device
1. Alice obtains an ePUF device.
2. Alice probes the ePUF with a challenge C.

3. Alice obtains the response R from the ePUF.
4. Alice uses the pair (C, R) to establish an identity for the device within her system:
    i. Alice maps the pair (C, R) to her device.
    ii. Alice keeps a database of all her devices and CRP mappings.
5. Alice may wish to publish attestations to her CRP, such as the double-hash $H^2(R)$ of the response.

In the case above, where we create a 'self-sovereign' identity for a device, it can be seen that the design may be highly useful within a closed system, where an administrator is simply looking to identify different devices within that system. This may also be useful for attesting to others later on. However, the lack of a trusted third party during setup still limits the prover in convincing an external verifier that the devices have not been changed, depending on the scenario.

Note that case 1 and case 2 may be considered as the same process but with a different intended purpose. Therefore case 1 and case 2 may be taken together as a method for generating a 'self-sovereign' identity, for human or machine, where in the latter case the system administrator (such as Alice, in an IoT system) is a trusted entity herself. In both cases, Alice is the trusted entity.

3.4.2 Verification: The verification process for this case is as simple as probing the ePUF device with a given challenge and inspecting its response. More complex proofs or evidence for external parties may need to be built on top of this to prove the identity to them.

3.4.3 Update: the update process for this case is simply a repetition of the setup process, where the administrator (in this case Alice) enumerates additional CRPs for forward use.

3.4.4. Revocation: in this scenario, the only type of identity revocation is the case where the administrator (Alice) wishes to independently revoke the identity, as there is no third party involve in this process. This means that revocation may be as simple as Alice's cessation of use of the ePUF device, and the purging of her database of its CRPs.

In a later section, ways are disclosed in which this self-sovereign revocation can be made more robust by blockchain attestation and evidencing, such that it may convince an external party at a later time.

3.5. Identity-Based CRP Management

In the above, especially the remote PUF-based identity system, the single-use nature of the CRPs used to authenticate identity in the setup and verification protocols presents a CRP-management challenge for the involved parties.

For instance, in the cases where the trusted third-party does not access the PUF device during setup, it may be desired that many CRPs are enumerated $\{(C_1, R_1), (C_2, R_2), \ldots, (C_n, R_n)\}$ for the third party to store for future verifications.

Moreover, because the ePUF itself acts as a deterministic pseudo-random mapping of challenges to responses, the responses will appear mutually unrelated. Therefore the burden on the trusted third party to tabulate and store sets of CRPs for their users or clients will quickly present a scaling issue if they must service a large number of users.

FIG. 8A illustrates a deterministic derivation of challenges from identification data in accordance with embodiments disclosed herein.

According to such embodiments, in order to address the issue of the burden on the trusted third party, CRP management is handled primarily in the generation of the challenges $C_1, C_2, \ldots, C_n$. The idea here is that the challenges should be derived deterministically (and possibly also hierarchically) from a single master challenge, or master data from which a master challenge is derived. This concept is similar to the use of hierarchical deterministic (HD) wallets to manage single-use Bitcoin keys, in that it is designed to allow the trusted third-party (or another relevant party) to recover all relevant challenges using only the master data, which is termed a 'wallet seed' in the Bitcoin scenario.

In some such embodiments, identification data 806 of Alice (the target party 103T) is used as the master data for generating a large range of challenges to determine which CRPs are used in identity systems such as those proposed in the previous sections. The identification data itself may comprise a combination 804 of different data elements 802, but in combination they preferably have the following properties:

Uniqueness—the identification data is unique to the entity it pertains to; and

Secrecy—the identification data is known only to the entity (or owner thereof) it pertains to.

Simple examples of constituents to the identification data may include a passport number, national insurance number, names, birth date, or the answers to a security question (e.g. mother's maiden name), or serial numbers and manufacturing information in the case of device identification. However, it is perceived that data obtained by more advanced technological means may also be used, such as fingerprint or facial recognition data, which may be extracted using fuzzy-magic techniques to conserve uniqueness.

In embodiments, the 'identification data' used as the master input, from which a set of challenges are derived, may comprise a multiplicity of the above. One reason for this is to ensure that the information preserves secrecy with respect to as many trusted third-parties as possible, given that as some of the protocols in the previous sections rely on sharing challenges with the third-party and/or with an external verifying party. Identification data comprising multiple components will be harder for any third-party so fully duplicate without the consent of the proving party Alice.

A mechanism for deterministically generating CRPs using identification data is shown in FIG. 8A. The constituent parts of the identification data are first combined by process 'A' (804), which may be concatenation, bitwise operations (e.g. XOR) or any other relevant combination operation, with a note that this operation may seek to preserve privacy by converting the raw data into an obfuscated form.

The identifying data is then turned into a master challenge Cm, by means of a hash function or similar process. Finally, the master challenge is used to deterministically derive a sequence of single-use challenges $C_1$, $C_2$, . . . , $C_n$ using a derivation function $f(\ )$. In embodiments, as shown in FIG. 8B, the derivation function $f(\ )$ may comprise a hash function and the injection of a nonce, such that each successive challenge is generated as $C_i = SHA256(C_{i-1}, i)$, where i serves as the nonce.

The process A, the generation of a challenge Cm from identification data, and the derivation function $f(\ )$ may all be configured depending on the needs of the particular implementation.

FIG. 8C shows another particular example, namely a hierarchical and deterministic derivation of challenges (responses not pictured). It may be desirable to derive the single-use challenges $C_i$ from the master $C_m$ in a hierarchical manner, as shown in FIG. 8B. In this case, CRP-management is further improved by the fact that the generation of a particular challenge does not need to depend on all of the previous challenges, as in the previous case.

The use of deterministic derivation of challenges based on identity data reduces the storage overhead for both the prover Alice and the trusted third-party in identity protocols. It is possible for either party to only store the (or a subset of) the identifying data, and recompute the necessary challenges as and when required.

In addition, Alice also has the option to tailor her privacy by choosing to withhold or share as much information with each identification service as desired, with the trade-off that she may store more data herself.

4. EXAMPLE BLOCKCHAIN SYSTEM

The following describes an example blockchain system that may be employed in certain embodiments of the present disclosure. Note that "Alice" and "Bob" are just arbitrary names for two parties, and Alice and Bob do not necessarily have the same roles in this section as in the preceding section or following sections.

In some embodiments, response data based on the output of a PUF may be stored on chain, for instance as discussed in the preceding section. The response data stored on chain may take the form of the actual response itself, or a transformation of it such as a hash or double hash (a so-called attestation or hash-commit), or a public key of a public-private key pair derived from the PUF response. Whatever form the on-chain response data takes, it is something that enables another, verifying party to check whether a target response or signature presented as evidence of identity is as expected. In further embodiments, the blockchain may be used as a means to manage challenge-response pairs, such as to update or revoke them.

The following describes an example of a blockchain system that may be used to implement such features.

4.1. Example System Overview

FIG. 1 shows an example system 100 for implementing a blockchain 150. The system 100 may comprise a packet-switched network 101, typically a wide-area internetwork such as the Internet. The packet-switched network 101 comprises a plurality of blockchain nodes 104 that may be arranged to form a peer-to-peer (P2P) network 106 within the packet-switched network 101. Whilst not illustrated, the blockchain nodes 104 may be arranged as a near-complete graph. Each blockchain node 104 is therefore highly connected to other blockchain nodes 104.

Each blockchain node 104 comprises computer equipment of a peer, with different ones of the nodes 104 belonging to different peers. Each blockchain node 104 comprises processing apparatus comprising one or more processors, e.g. one or more central processing units (CPUs), accelerator processors, application specific processors and/or field programmable gate arrays (FPGAs), and other equipment such as application specific integrated circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 104 in the distributed or blockchain network 106. As mentioned above, maintaining a copy of the blockchain 150 does not necessarily mean storing the blockchain 150 in full. Instead, the blockchain 150 may be pruned of data so long as each blockchain node 150 stores the block header (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 104 is configured to forward transactions 152 to other blockchain nodes 104, and thereby cause transactions 152 to be propagated throughout the network 106. Each blockchain node 104 is configured to create blocks 151 and to store a respective copy of the same blockchain 150 in their respective memory. Each blockchain node 104 also maintains an ordered set (or "pool") 154 of transactions 152 waiting to be incorporated into blocks 151. The ordered pool 154 is often referred to as a "mempool".

This term herein is not intended to limit to any particular blockchain, protocol or model. It refers to the ordered set of transactions which a node 104 has accepted as valid and for which the node 104 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 106, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when a party 103, such as an individual user or an organization, wishes to enact a new transaction 152*j* (either manually or by an automated process employed by the party), then the enacting party sends the new transaction from its computer terminal 102 to a recipient. The enacting party or the recipient will eventually send this transaction to one or more of the blockchain nodes 104 of the network 106 (which nowadays are typically servers or data centres, but could in principle be other user terminals). It is also not excluded that the party 103 enacting the new transaction 152*j* could send the transaction directly to one or more of the blockchain nodes 104 and, in some examples, not to the recipient. A blockchain node 104 that receives a transaction checks whether the transaction is valid according to a blockchain node protocol which is applied at each of the blockchain nodes 104. The blockchain node protocol typically requires the blockchain node 104 to check that a cryptographic signature in the new transaction 152*j* matches the expected signature, which depends on the previous transaction 152*i* in an ordered sequence of transactions 152. In such an output-based transaction protocol, this may comprise checking that the cryptographic signature or other authorisation of the party 103 included in the input of the new transaction 152*j* matches a condition defined in the output of the preceding transaction 152*i* which the new transaction assigns, wherein this condition typically comprises at least checking that the cryptographic signature or other authorisation in the input of the new transaction 152*j* unlocks the output of the previous transaction 152*i* to which the input of the new transaction is linked to. The condition may be at least partially defined by a script included in the output of the preceding transaction 152*i*. Alternatively it could simply be fixed by the blockchain node protocol alone, or it could be due to a combination of these. Either way, if the new transaction 152*j* is valid, the blockchain node 104 forwards it to one or more other blockchain nodes 104 in the blockchain network 106. These other blockchain nodes 104 apply the same test according to the same blockchain node protocol, and so forward the new transaction 152*j* on to one or more further nodes 104, and so forth. In this way the new transaction is propagated throughout the network of blockchain nodes 104.

In an output-based model, the definition of whether a given output (e.g. UTXO) is assigned (e.g. spent) is whether it has yet been validly redeemed by the input of another, onward transaction 152*j* according to the blockchain node protocol. Another condition for a transaction to be valid is that the output of the preceding transaction 152*i* which it attempts to redeem has not already been redeemed by another transaction. Again if not valid, the transaction 152*j* will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance.

Because again there is a defined order of transactions, the account balance has a single defined state at any one time.

In addition to validating transactions, blockchain nodes 104 also race to be the first to create blocks of transactions in a process commonly referred to as mining, which is supported by "proof-of-work". At a blockchain node 104, new transactions are added to an ordered pool 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered pool of pending transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 104 that is trying to solve the puzzle.

The first blockchain node 104 to solve the puzzle announces this to the network 106, providing the solution as proof which can then be easily checked by the other blockchain nodes 104 in the network (once given the solution to a hash it is straightforward to check that it causes the output of the hash to meet the condition). The first blockchain node 104 propagates a block to a threshold consensus of other nodes that accept the block and thus enforce the protocol rules. The ordered set of transactions 154 then becomes recorded as a new block 151 in the blockchain 150 by each of the blockchain nodes 104. A block pointer 155 is also assigned to the new block 151n pointing back to the previously created block 151n-1 in the chain. The significant amount of effort, for example in the form of hash, required to create a proof-of-work solution signals the intent of the first node 104 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 104 in the blockchain network 106. The block pointer 155 also imposes a sequential order to the blocks 151. Since the transactions 152 are recorded in the ordered blocks at each blockchain node 104 in a network 106, this therefore provides an immutable public ledger of the transactions.

Note that different blockchain nodes 104 racing to solve the puzzle at any given time may be doing so based on different snapshots of the pool of yet-to-be published transactions 154 at any given time, depending on when they started searching for a solution or the order in which the transactions were received. Whoever solves their respective puzzle first defines which transactions 152 are included in the next new block 151n and in which order, and the current pool 154 of unpublished transactions is updated. The blockchain nodes 104 then continue to race to create a block from the newly-defined ordered pool of unpublished transactions 154, and so forth. A protocol also exists for resolving any "fork" that may arise, which is where two blockchain nodes 104 solve their puzzle within a very short time of one another such that a conflicting view of the blockchain gets propagated between nodes 104. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 104 is granted the ability to newly assign an additional, accepted amount of the digital asset in a new special kind of transaction which distributes an additional defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction" or "generation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 104 that created the block 151n in which that transaction was published. This fee is normally referred to as the "transaction fee", and is discussed blow.

Due to the resources involved in transaction validation and publication, typically at least each of the blockchain nodes 104 takes the form of a server comprising one or more physical server units, or even whole a data centre. However in principle any given blockchain node 104 could take the form of a user terminal or a group of user terminals networked together.

The memory of each blockchain node 104 stores software configured to run on the processing apparatus of the blockchain node 104 in order to perform its respective role or roles and handle transactions 152 in accordance with the blockchain node protocol. It will be understood that any action attributed herein to a blockchain node 104 may be performed by the software run on the processing apparatus of the respective computer equipment. The node software may be implemented in one or more applications at the application layer, or a lower layer such as the operating system layer or a protocol layer, or any combination of these.

Also connected to the network 101 is the computer equipment 102 of each of a plurality of parties 103 in the role of consuming users. These users may interact with the blockchain network 106 but do not participate in validating transactions or constructing blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 104).

Some or all of the parties 103 may be connected as part of a different network, e.g. a network overlaid on top of the blockchain network 106. Users of the blockchain network (often referred to as "clients") may be said to be part of a system that includes the blockchain network 106; however, these users are not blockchain nodes 104 as they do not perform the roles required of the blockchain nodes. Instead, each party 103 may interact with the blockchain network 106 and thereby utilize the blockchain 150 by connecting to (i.e. communicating with) a blockchain node 106. Two parties 103 and their respective equipment 102 are shown for illustrative purposes: a first party 103a and his/her respective computer equipment 102a, and a second party 103*b* and his/her respective computer equipment 102*b*. It will be understood that many more such parties 103 and their respective computer equipment 102 may be present and participating in the system 100, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second "party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective party 103 to create, authorise (for example sign) and send transactions 152 to one or more bitcoin nodes 104 to then be propagated throughout the network of blockchain nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment 102 is operatively coupled to at least one of the blockchain nodes 104 of the network 106. This enables the wallet function of the client 105 to send transactions 152 to the network 106. The client 105 is also able to contact blockchain nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. As set out above, each blockchain node 104 runs software configured to validate transactions 152 according to the blockchain node protocol, and to forward transactions 152 in order to propagate them throughout the blockchain network 106. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 104 in the network 106.

When a given party 103, say Alice, wishes to send a new transaction 152*j* to be included in the blockchain 150, then she formulates the new transaction in accordance with the relevant transaction protocol (using the wallet function in her client application 105). She then sends the transaction 152 from the client application 105 to one or more blockchain nodes 104 to which she is connected. E.g. this could be the blockchain node 104 that is best connected to Alice's computer 102. When any given blockchain node 104 receives a new transaction 152*j*, it handles it in accordance with the blockchain node protocol and its respective role. This comprises first checking whether the newly received transaction 152*j* meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152*j* passes the test for being deemed valid (i.e. on condition that it is "validated"), any blockchain node 104 that receives the transaction 152*j* will add the new validated transaction 152 to the ordered set of transactions 154 maintained at that blockchain node 104. Further, any blockchain node 104 that receives the transaction 152*j* will propagate the validated transaction 152 onward to one or more other blockchain nodes 104 in the network 106. Since each blockchain node 104 applies the same protocol, then assuming the transaction 152*j* is valid, this means it will soon be propagated throughout the whole network 106.

Once admitted to the ordered pool of pending transactions 154 maintained at a given blockchain node 104, that blockchain node 104 will start competing to solve the proof-of-work puzzle on the latest version of their respective pool of 154 including the new transaction 152 (recall that other blockchain nodes 104 may be trying to solve the puzzle based on a different pool of transactions 154, but whoever gets there first will define the set of transactions that are included in the latest block 151. Eventually a blockchain node 104 will solve the puzzle for a part of the ordered pool 154 which includes Alice's transaction 152*j*). Once the proof-of-work has been done for the pool 154 including the new transaction 152*j*, it immutably becomes part of one of the blocks 151 in the blockchain 150. Each transaction 152 comprises a pointer back to an earlier transaction, so the order of the transactions is also immutably recorded.

Different blockchain nodes 104 may receive different instances of a given transaction first and therefore have conflicting views of which instance is 'valid' before one instance is published in a new block 151, at which point all blockchain nodes 104 agree that the published instance is the only valid instance. If a blockchain node 104 accepts one instance as valid, and then discovers that a second instance has been recorded in the blockchain 150 then that blockchain node 104 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

4.2. UTXO-Based Model

Figure 2:
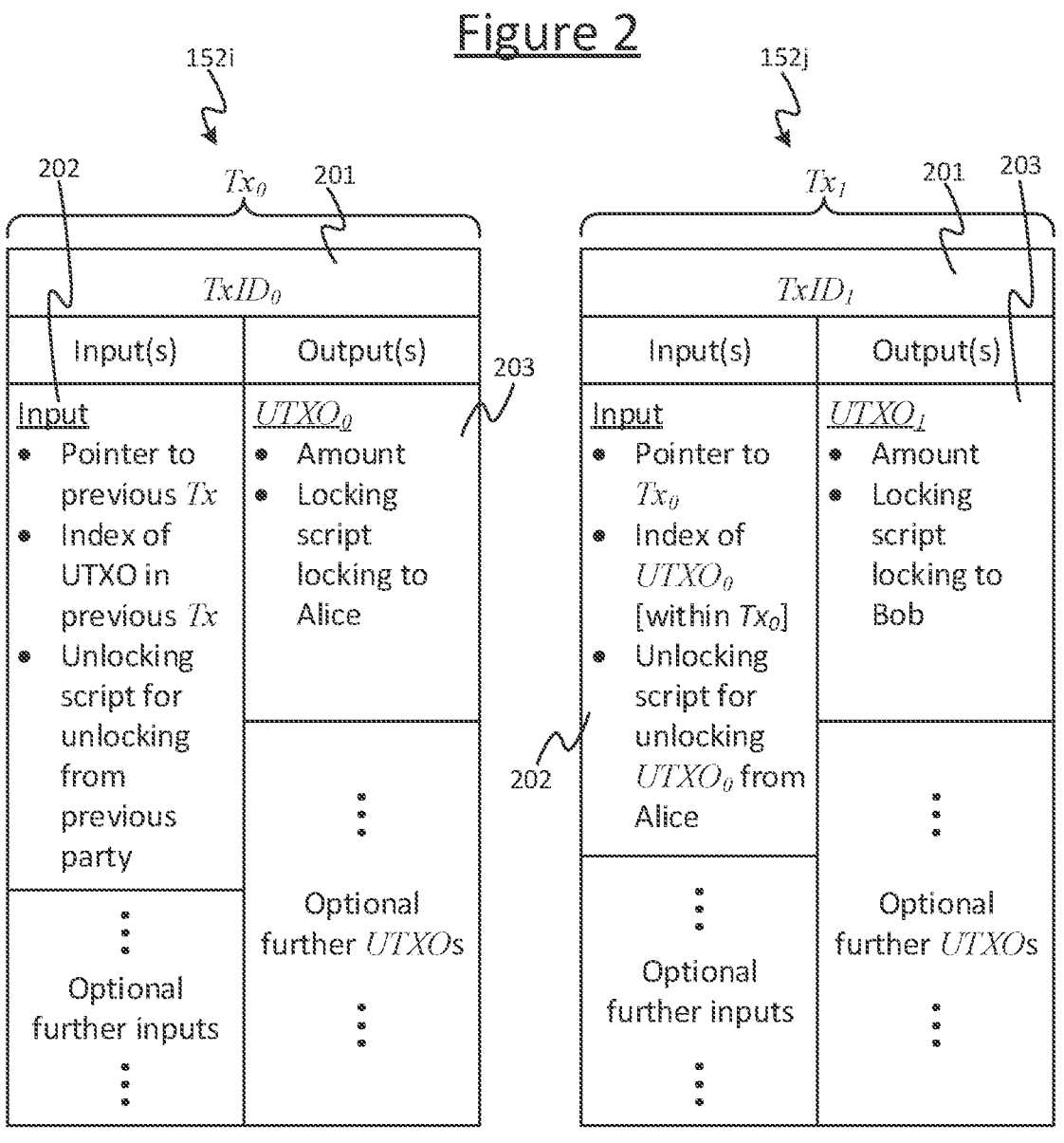
FIG. 2 schematically illustrates some examples of transactions which may be recorded in a blockchain, FIG. 3 schematically illustrates a challenge and response of a PUF.

FIG. 2 illustrates an example transaction protocol. This is an example of a UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this is not limiting to all possible embodiments. Note that while the example UTXO-based protocol is described with reference to bitcoin, it may equally be implemented on other example blockchain networks.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO includes a value specifying an amount of a digital asset. This represents a set number of tokens on the distributed ledger. The UTXO may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the nodes 104.

Say Alice 103*a* wishes to create a transaction 152*j* transferring an amount of the digital asset in question to Bob 103*b*. In FIG. 2 Alice's new transaction 152*j* is labelled "Tx$_1$". It takes an amount of the digital asset that is locked to Alice in the output 203 of a preceding transaction 152*i* in the sequence, and transfers at least some of this to Bob. The preceding transaction 152*i* is labelled "Tx$_0$" in FIG. 2. Tx$_0$ and Tx$_1$ are just arbitrary labels. They do not necessarily mean that Tx$_0$ is the first transaction in the blockchain 151, nor that Tx$_1$ is the immediate next transaction in the pool 154. Tx$_1$ could point back to any preceding (i.e. antecedent) transaction that still has an unspent output 203 locked to Alice.

The preceding transaction Tx$_0$ may already have been validated and included in a block 151 of the blockchain 150 at the time when Alice creates her new transaction Tx$_1$, or at least by the time she sends it to the network 106. It may already have been included in one of the blocks 151 at that time, or it may be still waiting in the ordered set 154 in which case it will soon be included in a new block 151. Alternatively Tx$_0$ and Tx$_1$ could be created and sent to the network 106 together, or Tx$_0$ could even be sent after Tx$_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given blockchain node 104. Nevertheless, a subsequent transaction (the descendent transaction or "child") which points to a preceding transaction (the antecedent transaction or "parent") will not be validated until and unless the parent transaction is validated. A child that arrives at a blockchain node 104 before its parent is considered an orphan. It may be discarded or buffered for a certain time to wait for the parent, depending on the node protocol and/or node behaviour.

One of the one or more outputs 203 of the preceding transaction Tx$_0$ comprises a particular UTXO, labelled here UTXO$_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S) which is used by the blockchain network. The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, UTXO$_0$ in the output 203 of Tx$_0$ comprises a locking script [Checksig P$_A$] which requires a signature Sig P$_A$ of Alice in order for UTXO$_0$ to be redeemed (strictly, in order for a subsequent transaction attempting to redeem $UTXO_0$ to be valid). [Checksig $P_A$] contains a representation (i.e. a hash) of the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). The data (or "message") that needs to be signed by Alice to provide a valid signature may be defined by the locking script, or by the node protocol, or by a combination of these.

When the new transaction $Tx_1$ arrives at a blockchain node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$> <$P_A$> ‖ [Checksig $P_A$]

where "‖" represents a concatenation and "< . . . >" means place the data on the stack, and "[ . . . ]" is a function comprised by the locking script (in this example a stack-based language). Equivalently the scripts may be run one after the other, with a common stack, rather than concatenating the scripts. Either way, when run together, the scripts use the public key $P_A$ of Alice, as included in the locking script in the output of $Tx_0$, to authenticate that the unlocking script in the input of $Tx_1$ contains the signature of Alice signing the expected portion of data. The expected portion of data itself (the "message") also needs to be included in order to perform this authentication. In embodiments the signed data comprises the whole of $Tx_1$ (so a separate element does not need to be included specifying the signed portion of data in the clear, as it is already inherently present).

The details of authentication by public-private cryptography will be familiar to a person skilled in the art. Basically, if Alice has signed a message using her private key, then given Alice's public key and the message in the clear, another entity such as a node 104 is able to authenticate that the message must have been signed by Alice. Signing typically comprises hashing the message, signing the hash, and tagging this onto the message as a signature, thus enabling any holder of the public key to authenticate the signature. Note therefore that any reference herein to signing a particular piece of data or part of a transaction, or such like, can in embodiments mean signing a hash of that piece of data or part of the transaction.

If the unlocking script in $Tx_1$ meets the one or more conditions specified in the locking script of $Tx_0$ (so in the example shown, if Alice's signature is provided in $Tx_1$ and authenticated), then the blockchain node 104 deems $Tx_1$ valid. This means that the blockchain node 104 will add $Tx_1$ to the ordered pool of pending transactions 154. The blockchain node 104 will also forward the transaction $Tx_1$ to one or more other blockchain nodes 104 in the network 106, so that it will be propagated throughout the network 106. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the blockchain node 104 also needs to check whether the referenced UTXO in the preceding transaction $Tx_0$ is already spent (i.e. whether it has already formed a valid input to another valid transaction). This is one reason why it is important for the blockchain 150 to impose a defined order on the transactions 152. In practice a given blockchain node 104 may maintain a separate database marking which UTXOs 203 in which transactions 152 have been spent, but ultimately what defines whether a UTXO has been spent is whether it has already formed a valid input to another valid transaction in the blockchain 150.

If the total amount specified in all the outputs 203 of a given transaction 152 is greater than the total amount pointed to by all its inputs 202, this is another basis for invalidity in most transaction models. Therefore such transactions will not be propagated nor included in a block 151.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the bitcoin node 104 that successfully includes her transaction 104 in a block 151. If Alice does not include such a fee, $Tx_0$ may be rejected by the blockchain nodes 104, and hence although technically valid, may not be propagated and included in the blockchain 150 (the node protocol does not force blockchain nodes 104 to accept transactions 152 if they don't want). In some protocols, the transaction fee does not require its own separate output 203 (i.e. does not need a separate UTXO). Instead any difference between the total amount pointed to by the input(s) 202 and the total amount of specified in the output(s) 203 of a given transaction 152 is automatically given to the blockchain node 104 publishing the transaction. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference may be assigned by the node 104 that wins the proof-of-work race to create the block containing $UTXO_1$. Alternatively or additionally however, it is not necessarily excluded that a transaction fee could be specified explicitly in its own one of the UTXOs 203 of the transaction 152.

Alice and Bob's digital assets consist of the UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the bitcoin nodes 104.

Note that the script code is often represented schematically (i.e. not using the exact language). For example, one may use operation codes (opcodes) to represent a particular function. "OP . . . " refers to a particular opcode of the Script language. As an example, OP_RETURN is an opcode of the Script language that when preceded by OP_FALSE at the beginning of a locking script creates an unspendable output of a transaction that can store data within the transaction, and thereby record the data immutably in the blockchain 150. E.g. the data could comprise a document which it is desired to store in the blockchain.

Typically an input of a transaction contains a digital signature corresponding to a public key $P_A$. In embodiments this is based on the ECDSA using the elliptic curve secp256k1. A digital signature signs a particular piece of data. In some embodiments, for a given transaction the signature will sign part of the transaction input, and some or all of the transaction outputs. The particular parts of the outputs it signs depends on the SIGHASH flag. The SIGHASH flag is usually a 4-byte code included at the end of a signature to select which outputs are signed (and thus fixed at the time of signing).

The locking script is sometimes called "scriptPubKey" referring to the fact that it typically comprises the public key of the party to whom the respective transaction is locked. The unlocking script is sometimes called "scriptSig" referring to the fact that it typically supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

4.3. Side Channel

As shown in FIG. 1, the client application on each of Alice and Bob's computer equipment 102a, 120b, respectively, may comprise additional communication functionality. This additional functionality enables Alice 103a to establish a separate side channel 107 with Bob 103b (at the instigation of either party or a third party). The side channel 107 enables exchange of data separately from the blockchain network. Such communication is sometimes referred to as "off-chain" communication. For instance this may be used to exchange a transaction 152 between Alice and Bob without the transaction (yet) being registered onto the blockchain network 106 or making its way onto the chain 150, until one of the parties chooses to broadcast it to the network 106. Sharing a transaction in this way is sometimes referred to as sharing a "transaction template". A transaction template may lack one or more inputs and/or outputs that are required in order to form a complete transaction. Alternatively or additionally, the side channel 107 may be used to exchange any other transaction related data, such as keys, negotiated amounts or terms, data content, etc.

The side channel 107 may be established via the same packet-switched network 101 as the blockchain network 106. Alternatively or additionally, the side channel 301 may be established via a different network such as a mobile cellular network, or a local area network such as a local wireless network, or even a direct wired or wireless link between Alice and Bob's devices 102a, 102b. Generally, the side channel 107 as referred to anywhere herein may comprise any one or more links via one or more networking technologies or communication media for exchanging data "off-chain", i.e. separately from the blockchain network 106. Where more than one link is used, then the bundle or collection of off-chain links as a whole may be referred to as the side channel 107. Note therefore that if it is said that Alice and Bob exchange certain pieces of information or data, or such like, over the side channel 107, then this does not necessarily imply all these pieces of data have to be send over exactly the same link or even the same type of network.

The side channel 107 may comprise a secure channel employing known secure communications techniques to enable secure, private off-chain communication between parties such as Alice and Bob. For example the secure channel may be based on a shared secret shared between the parties communicating over the secure channel. Such a channel may be used, for example, to communicate between the verifying party 103V and the target party 103T, such as to enable the verifying party 103V to submit a challenge to a PUF 302/500 held by the target party, and to receive back the corresponding response.

5. BLOCKCHAIN BASED PUF IDENTITY ATTESTATION

As mentioned in previous sections, response data serving as a record of a response may be stored on a public blockchain rather than employing a trusted third party system 602. The response data is data determined at set-up, and can later be used by a verifying party 103V ("Bob") to test an assertion of a target's identity by a target party 103T ("Alice"). Note again that Alice and Bob are just arbitrary labels, and Alice and Bob do not necessarily have the same role here as in the general overview of blockchain systems given in section 4 (where Bob was spending the output of a transaction of Alice's).

As discussed previously, the response data for a given CR pair {Ci, Ri} (whether stored on chain or elsewhere) may comprise any of the following, as determined in the set-up phase 702 and stored for future reference by the verifying party 103V:

i) an explicit value (either in the clear or encrypted) of the challenge Ci and/or response Ri, or
  ii) an explicit value of the response Ri linked to a master challenge Cm from which the particular challenge Ci for the respective response Ri can be derived, or
  iii) an attestation (e.g. hash or double hash) of the response Ri together with an explicit value of the challenge Ci, or
  iv) an attestation (e.g. hash or double hash) of the response Ri linked to a master challenge Cm from which the particular challenge for the respective response Ri can be derived, or
  v) a public key of a public-private key pair derived from the response Ri.

Figure 9:
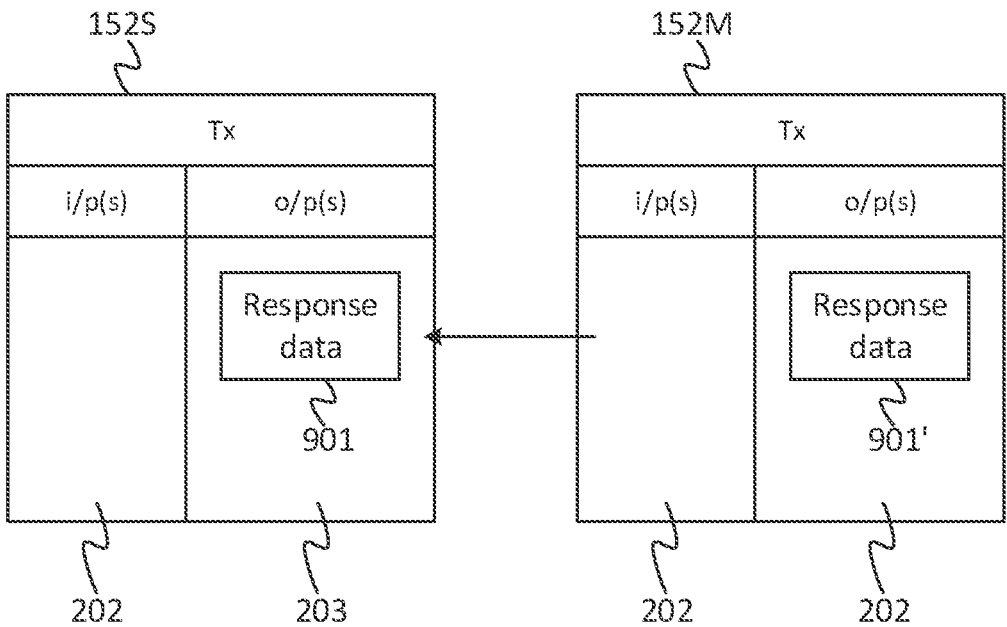

As shown in FIG. 9, whatever form it takes, in the set-up phase 702 such response data 901 can be stored in the output 203 of a transaction 152S recorded on a blockchain 150. This may be referred to in the following as a storage transaction. It may be recorded on chain for example using the techniques discussed in section 4 above, noting again that Alice in that section is not necessarily the target party 103T and Bob in that section is not necessarily the verifying party 103V—in fact the target party 103T, now referred to as Alice, may be the one who formulates and sends off the storage transaction 152S to be recorded on chain. As another example, the trusted third party may formulate a template of the storage transaction for target party 103T to complete by including the response data 901 generated at set-up, and then forward to be recorded on chain. The target part 103T may send the storage transaction 152S directly to one of the blockchain nodes 104 to be propagated through the blockchain network 106, or may send it indirectly via another party such as the trusted third party. As yet another example, the target party 103T may send his/her response data 901 to the trusted third party, for the trusted third party to formulate into the storage transaction 152 and send off to be recorded on chain.

The response data 901 may be stored in an unspendable output of the storage transaction 152S. E.g. this may be made unspendable by means of an OP_RETURN, or an OP_FALSE followed by an OP_RETURN, if using the Script protocol (in some blockchain protocols like BTC or BCH, any inclusion of OP_RETURN makes an output unspendable, whereas in others like BSV, both OP_FALSE and OP_RETURN are required to make an output unspendable). BTC (Bitcoin), BTC (Bitcoin Cash), and BSV (Bitcoin Satoshi Vision) are different example implementations of the blockchain system described earlier.

Alternatively the response data 901 may be embedded in a spendable output of the storage transaction 152S. E.g. this could be kept spendable by including an OP_RETURN without OP_FALSE. As another example, one can embed data in a spendable locking script by including it immediately before an OP_DROP code. This would apply equally to BTC, BCH and BSV.

In embodiments the response data 901 of a set of multiple different CR pairs {Ci, Ri} of a given target party 103T may be stored. These may be stored in the same output 203 or different outputs 203 of the storage transaction 152, or a combination of some in the same output and some in different outputs. They may be stored in the same storage transaction 152S, or the response data 901 of different CR pairs may be stored in different storage transactions 152S, or a combination of some in the same transaction and some in different transactions.

Note that the on-chain storage is not necessarily limited to an account-based model. In alternative deployments, the response data 901 could be stored in one or more smart contracts of one or more transactions of an account-based model.

In the verification phase 704, when the verifying party 103V wishes to verify the identity of the target, then he/she accesses the blockchain 150, in order to obtain the response data 901 corresponding to one a particular CR pair from a storage transaction 152S. In embodiments this gives the verifying party 103V the response Ri corresponding to a particular challenge Ci, or the attestation (e.g. hash or double hash) of that response Ri. The verifying party 103V also submits the challenge Ci to the target party 103V, and in response receives back the (purported) response R'i which the target party 103T (or their device) generates by inputting the received challenge Ci to the PUF module 603. The verifying party 103V then compares the returned response R'i with the version retrieved from the storage transaction 152S on chain, or applies the same transformation (e.g. H(R'i) or H²(R'i)) to the received response that was used for the attestation and compares this with the attestation that was retrieved from the storage transaction 152S on chain. Either way, if the comparison gives a match, the target is verified.

The verifying party 103V may access the blockchain 150 via one of the nodes 104 of the blockchain network 106, or alternatively by obtaining the response data from any external party, who may also provide a Merkle proof of inclusion of that data (i.e. the transaction) in the blockchain.

In embodiments where the response data 901 is stored on a public medium such as a blockchain 150, it may be desirable that the actual response value Ri itself is not disclosed publicly or unrestrictedly. Otherwise any malicious party can view the Ri on chain and then pretend to be the target party 103T if challenged with Ci. Instead there-fore, it may be preferred to store only the attestation of Ri (e.g. H(Ri) or H²(Ri)) as the response data 901 held on chain, or else to store the explicit value of Ri but in encrypted form. Or in some cases the attestation could be stored on chain in encrypted form.

In the case where there are potentially multiple verifying parties, storing Ri or the attestation thereof in encrypted form enables the target party 103T or trusted third party to control which verifying parties 103V are able to obtain the storage data 901 corresponding to which of CR pairs. This may be achieved by only giving the decryption key for a certain piece of response data 901 to a given verifying party, and giving the decryption key for another piece of response data 901 only to another verifying party. The distribution of the decryption keys could be administered by the target party 103T or the trusted third party. Each verifying party or subset of verifying parties is given their own subset of one or more decryption keys for accessing a respective subset of the pieces of response data 901 (e.g. CR pairs). Preferably the subsets are exclusive of one another. However in other implementations they could overlap (e.g. different groups within the same organization could have access to overlapping subsets of CR pairs).

As a variant of this if response data 901 (e.g. CR pairs) are stored in a third party system 602 instead of on-chain, then instead of (or as well as) distributing decryption keys, other means may be employed to ensure each verifying party only gets access to their own subset of CR pairs (or more generally response data). E.g. the trusted third party system 602 may maintain a password protected account for each verifying party, which they are required to log into to gain access to their challenge(s) and which only gives them access to their own CR pair(s).

Such schemes may be advantageous for security. If a response Ri of a given CR pair is to be disclosed to one verifying party 103V, it may be desirable that the same CR pair is not used for another verifying party 103V. Otherwise the first verifying party 103V could use the now-known response Ri to pretend to another verifying party that he/she is the target party 103T. However, taking steps to prevent this is not essential if all the potential verifying parties 103V with access to the response data 901 are trusted.

In further variants, the response data 901 stored on chain could take the form of a public key of the target party 103T, being a public key of a public-private key pair generated at set-up based on a corresponding response Ri (e.g. using it as a seed). In this case the verifying party 103V accesses the public key from the storage transaction 152S and uses it to verify a message signed by the target party 103T with the corresponding private key. In some cases the public keys could be stored on chain in encrypted form so that different public keys can be allocated for use by different verifying parties 103V.

As also shown in FIG. 9, in embodiments that employ an output (e.g. UTXO-based) model, then this may be exploited to provide an efficient mechanism for managing CR pairs (or keys derived therefrom). Managing here may comprise updating or revoking a CR pair or key, e.g. once it has already been consumed (used in a verification).

To do this, a new modifier transaction 152M is recorded on the blockchain 150. It has an input 202 which points to one of the outputs 203 of the storage transaction 152S in which the piece of response data 901 to be revoked or updated is stored. This may be referred to as "spending", "redeeming" or "assigning" that output (though note that this does not necessarily imply the transfer of monetary value). This is understood at the level of a layer-2 protocol recognized by the verifying party 103V to mean that the response data 901 in the pointed-to storage transaction 152S or output 203 is no longer to be used. If the modifier transaction 152M itself contains response data 901' in one of its own outputs, this is taken to represent that the new response data 901' represents replacement of the previous response data 901 (e.g. a new CR pair). If the verifying party accesses the blockchain 150 to find response data to use in a verification operation, it will use the updated version 901' rather than the replaced version. If on the other hand the modifier transaction 152U does not contain replacement response data 901, then it is taken to simply revoke the response data 901 in the storage transaction 152S or output 203 to which it points.

In some embodiments, the response data 901 is embedded in a spendable output of the storage transaction 152S, and may be revoked or updated by spending (i.e. assigning or redeeming) the particular output 203 in which the response data 901 (e.g. CR pair) is stored. In some such embodiments, different pieces of response data 901 corresponding to different CR pairs may be stored in individual outputs 203 of the same storage transaction 203 and individually evoked or updated.

In other embodiments, the response data 901 is stored in an unspendable output of the storage transaction 152S, and may be revoked or updated by spending (i.e. assigning or redeeming) a different, spendable output of the storage transaction 152S. In some such embodiments, multiple pieces of storage data 901 corresponding to multiple different CR pairs (stored in the same or different unspendable outputs) may be revoked or updated by spending the same spendable output of the same transaction 152S.

As an example use case, the record of a piece of response data 901, corresponding to a CR pair, may be revoked or updated once it has been consumed, i.e. used in a verification. This could apply whether the response data 901 is an explicit record of Ri, or an attestation, or a public key derived from Ri. Either way, this may be advantageous for security reasons, so that response data which has now been released into the world is no longer usable again.

The modifier transaction 152M could be formulated and sent to be recorded on chain by the target party 103T. It could be sent either directly to a blockchain node 104 to propagate, or indirectly to a node 104 via an intermediate party. Alternatively the trusted third party may send a template transaction for the target party to complete (e.g. by signing and/or adding replacement response data 901') and then forward on to a node 104, either directly or indirectly, to be recorded on chain. As another possibility, the trusted third party could formulate the modifier transaction 152M (possibly based on a template or some data sent from the target part 103T, e.g. comprising replacement response data 901'), and then the trusted third party may send the modifier transaction 152M to a node 104 to be recorded on chain. Note that all of these options may also apply to the way in which the storage transaction 152S is recorded on the blockchain 150 as well.

According to the various concepts discussed above, there is thus provided a system for i) linking an identity (or other related information, such as a public key) to a UTXO, and using the spend-state of this UTXO as a proxy for the validity of the identity credentials; and ii) establishing a set of transactions to perform efficient identity-management operations, such as setup, revocation, update and verification. The process is more efficient in that the number of communications is reduced, as all parties can consult the blockchain to see when CRPs are consumed or identities revoked, rather than all parties needing to communicate with each other all the time.

Such techniques may be used for example to extend the framework for linking identity to PUF devices, as presented previously, by minimising the reliance on a third-party KYC (know your customer) provider for handling CRP data used in verification. This goal may be achieved by partially replacing the role, or rather some of the functions, of a KYC provider with a public blockchain, whereby a user may instantiate their own identity credentials, related to an ePUF device, independently of any third party.

The role of the trusted-third party in an identity system is not necessarily eschewed completely, but either way, the process of identity management may be improved such that their involvement in the process, and related burden placed on them, is at least reduced.

5.1. Linking PUF Identity to a UTXO Set

The first aspect whereby the use of a blockchain can improve on the identity systems, such as those discussed in previous sections, is by using the unspent transaction output set (UTXO set) of a public blockchain to manage CRPs relating to a PUF identity.

In this section, two distinct example mechanisms are disclosed for mapping CRPs to members of the UTXO set, and using their status as 'spent' or 'unspent' state as an indication of whether each particular CRP has been consumed in an identity verification process. The first mechanism involves embedding CRP data in spendable UTXOs, and the second involves pairing them to spendable UTXOs. In either case, additional data related to the CRPs, or the identity in question, may also be optionally included in the system.

5.1.1. Embedding in spendable UTXOs: The first mechanism is to bind CRPs to spendable UTXOs, which are transaction outputs containing scripts whose conditions can be satisfied by future inputs, and therefore can be consumed by future spending transactions. There are many different options for implementing such an embedding, but for our purposes this will generally consist at least of the following locking script:

$$[\text{Checksig } P] \text{ OP\_RETURN} < \text{Rep}(C,R) >$$

where [Checksig P] is a standard pay-to-public-key-hash (P2PKH) locking script, and Rep(C, R) is a representation of a particular challenge-response pair (C, R).

This locking script can be unlocked simply by providing a valid signature Sig P over a spending transaction, where the signature is considered valid against the public key P. It should be noted that any data that follows the opcode OP_RETURN will not be considered when validating a spending transaction, and therefore this data may be treated as arbitrary and unformatted with respect to blockchain validators.

The data following the OP_RETURN code in the script above is a representation Rep(C, R) of the challenge-response pair (C, R). This representation could be made in various ways, depending on the use case in question. However, a sensible example would be to encrypt the CRP using a key k known only to the prover Alice who owns the PUF. In this case, we could have any of the following representations:

$$\text{Rep}(C,R) = \text{Encrypt}(C,k),$$

$$\text{Rep}(C,R) = \text{Encrypt}(R,k),$$

$$\text{Rep}(C,R) = \text{Encrypt}(C\|R,k).$$

These representations would allow Alice to retrieve or prove, at a later time, either the challenge, response, or CRP respectively that was included in her UTXO.

Additional script encumbrances: It is possible to extend the basic locking script shown previously to include additional conditions on the input script that spends the output in the future. A sensible example of such an extra condition would be the following script:

$$[\text{Checksig } P][\text{Hash Puzzle } H^2(R)]$$
$$\text{OP\_RETURN}<\text{Rep}(C,R)>$$

where [Hash Puzzle $H^2(R)$]=OP\_HASH160<H(R) >OP\_EQUAL. Note that other hash function opcodes may be used. This modified script now requires the spender to reveal the hash of the challenge R in addition to providing a valid signature for the public key P. The idea here is that, in some scenarios, this can be used a knowledge proof that the spender knows the information H(R) that is in turn related to the challenge in question R.

Transaction models: Given that the exact structure of the transaction locking scripts to be used has been decided, the choice can then be made as to how to structure transactions containing these scripts as a way to attest store, attest to and manage CRPs.

It is disclosed herein to map CRPs, and the associated locking scripts, to UTXOs in a one-to-one manner. In other words, every UTXO containing such a script will correspond to exactly one CRP relating to a particular PUF device.

There are then a few options as to how to organise these UTXOs into transactions. The most likely possible options are as follows:

1. One CRP per transaction.
2. One CRP set per transaction.
3. One PUF per transaction.

The first option may be applicable in some cases, such as for PUFs that are very infrequently used, such as for updating a will, and has the benefit that multiple CRPs are not obviously linked with one another. This may be useful also in situations where extreme privacy is required, as the consumption and revelation of one CRP can be revealed independently of any others.

The transaction in Table 1 below is an example implementation of the first option. It can be seen that the transaction comprises only a single input and output, and therefore each CRP will be contained in different transaction. When its output is spent, the relevance of this transaction to the identity system is effectively ended, other than for auditing purposes.

TABLE 1 single CRP mapped to a UTXO in single transaction.
$\text{TxID}_{CRP\text{-}Single}$

| Input | | Output | |
|---|---|---|---|
| Outpoint | Script | Value | Script |
| $\text{TxID}_{Prev}$ | $<\text{SIG}_A>$ $<P_A>$ | x BSV | [Checksig $P_A^1$] OP\_RETURN $<\text{Rep}(C_1, R_1)>$ |

The second option, whereby many CRPs are each mapped to respective UTXOs in a single transaction, may be more desirable for a use case such as bank cards where the expected frequency of CRP-consumption is considerably higher. The transaction in Table 2 below shows how this can be achieved.

Note that the input signature, which would likely have been generated by Alice, can be made to sign over the entire set of outputs. This provides a one-to-many linkage from one public key $P_A$ to many UTXOs, and hence many CRPs, whilst maintaining a one-to-one mapping of UTXOs to distinct CRPs themselves. It is also assumed that each output/CRP has its own associated public key (all owned by Alice) to avoid reuse.

TABLE 2 a set of CRPs mapped to respective UTXOs of a single transaction
$\text{TxID}_{CRP\text{-}Set}$

| Input | | Output | |
|---|---|---|---|
| Outpoint | Script | Value | Script |
| $\text{TxID}_{Prev}$ | $<\text{SIG}_A>$ $<P_A>$ | x BSV | [Checksig $P_A^1$] OP\_RETURN $<\text{Rep}(C_1, R_1)>$ |
| | | x BSV | [Checksig $P_A^2$] OP\_RETURN $<\text{Rep}(C_2, R_2)>$ |
| | | x BSV | [Checksig $P_A^3$] OP\_RETURN $<\text{Rep}(C_3, R_3)>$ |
| | | | . . . |
| | | x BSV | [Checksig $P_A^n$] OP\_RETURN $<\text{Rep}(C_n, R_n)>$ |

The option shown above can also be integrated well with embodiments that update CRP sets over time, where each time an updated set is generated, a new transaction can be issued for that set. In addition, one can also generate and issue multiple different CRP sets for the same PUF at the same time, via parallel independent (i.e. not related on-chain) transactions. This may be useful for establishing identity with multiple different trusted-third parties (e.g. different banks) such that the identities are both independently established but are still anchored by the same PUF.

The third option, wherein a single transaction is used to represent a single PUF, is simply a more restrictive version of option 2, where updates are not possible. This may be applicable for cases where a PUF-containing device is given a particular 'lifespan', where it can only be used for a pre-determined number of authentications before a user is issued with a new device.

5.1.2. Pairing with Spendable UTXOs

An alternative to embedding CRPs within spendable UTXOs is to simply pair them with these outputs. In this case, a difference from the existing work on digital certificates is that the transaction may be constructed and signed by Alice, as she may wish to attest to an identity independently of any third-party.

TABLE 3

A transaction containing spendable UTXOs mapped to CRPs.
$\text{TxID}_{CRP\text{-}Set}$

| Input | | Output | |
|---|---|---|---|
| Outpoint | Script | Value | Script |
| $\text{TxID}_{Prev}$ | $<\text{SIG}_A><P_A>$ | x BSV | OP\_DUP OP\_HASH160 $<P_A^1>$ OP\_EQUALVERIFY OP\_CHECKSIG |
| | | 0 BSV | OP\_0 OP\_RETURN $<\text{Rep}(C_1, R_1)>$ |
| | | x BSV | OP\_DUP OP\_HASH160 $<P_A^2>$ OP\_EQUALVERIFY OP\_CHECKSIG |

TABLE 3-continued

A transaction containing spendable UTXOs mapped to CRPs.
$TxID_{CRP\text{-}Set}$

| Input | | Output | |
| --- | --- | --- | --- |
| Outpoint | Script | Value | Script |
| | | 0 BSV | OP_0 OP_RETURN <Rep($C_2$, $R_2$)> |
| | | | ... |
| | | x BSV | OP_DUP OP_HASH160 < $P_A^n$ > |
| | | | OP_EQUALVERIFY |
| | | | OP_CHECKSIG |
| | | 0 BSV | OP_0 OP_RETURN <Rep($C_n$, $R_n$)> |

In the diagram above can be seen an example transaction containing 2n outputs relating to n CRPs, whereby each spendable output can be mapped to one of the CRPs, and the CRP representation itself has been included in a corresponding unspendable output (e.g. OP_FALSE OP_RETURN). It should also be noted that the three possible variants for organising the CRPs into transactions and UTXOs apply similarly here.

5.1.3. Discussion

Benefits to CRP-management: the concept of mapping CRPs to UTXOs can significantly improve CRP management and handling for users of the identity protocols from the previous sections. An advantage is that one can partly offload the storage and lookup of CRPs to the blockchain network 106, and service providers who can facilitate reliable retrieval from it.

By mapping all of the 'live' CRPs of a particular PUF to UTXOs, it is possible to improve the CRP update process by querying the state of the UTXO set for accurate information about the CRPs currently available to a given PUF in an identity system.

An example of a simple process utilising the blockchain and the UTXO-CRP mapping conventions we have described is as follows:

1. Alice obtains a PUF device and enumerates a set of CRPs as $(C_1, R_1)$, $(C_2, R_2)$, . . . , $(C_n, R_n)$.
2. Alice generates a transaction $TxID_{CRP}$-Set as shown in Table 2 and broadcasts to the blockchain network.
3. Alice consumes multiple CRPs over time to authenticate her identity with a third party.
4. Alice now wishes to check if she has enough CRPs to cover her expected activities for the coming week:
    1. Alice queries a blockchain node 104, or SPV-like service provider, asking which UTXOs of $TxID_{CRP}$-Set are currently unspent.
    2. The blockchain node or service provider responds with the number of outputs of the transaction $TxID_{CRP}$-Set that are still unspent.
5. If the returned number is insufficient, Alice can perform an identity update process with her trusted-third party, or simply enumerate more CRPs for independently-established identity. Otherwise, Alice takes no action.

Embedding versus pairing: the choice of whether to embed CRPs within spendable outputs or to simply pair them with the outputs gives Alice the choice between two different benefits that distinguish these cases.

If the CRPs are embedded within spendable outputs, this incentivises the blockchain nodes 104, who maintain the blockchain network 106, to keep the data of these outputs readily available. This means that the responses to Alice's queries may be faster and, more crucially, the blockchain nodes are more likely to be able to serve the raw data of these transaction outputs back to Alice.

If, as previously discussed, the representation Rep(C, R) of the CRP is included such that it contains the raw (or obfuscated) data of a challenge, response or both, then this means Alice will be able to retrieve the relevant information from the blockchain network 106. This allows Alice to replace local storage, and operate a more lightweight system with the blockchain 150, as the embedding of the data in spendable outputs increases the likelihood that her data will have high availability regardless.

By contrast, if the CRPs are only paired with spendable outputs, then Alice may only be able to determine how many CRPs are available to her, but not necessarily retrieve the representation data itself from Bitcoin nodes. This may mean that Alice has to consult an agent outside of the blockchain node network 106 if she does not maintain her CRP set locally.

Using double-hashes: in the example implementations above, it is shown that the double-hash $H^2(Data)$ can be used as an on-chain representation of some Data. The reason for using the double-hash in this manner is that it allows the single-hash to also be revealed on-chain, acting in principle like a knowledge proof that a party knows H(Data), which is in turn connected to the Data.

This may be useful for example in a PUF-identity situation where $H^2(R)$ is recorded on-chain by Alice as a spending encumbrance that can be satisfied by a third-party providing H(R), given that Alice has shared the actual value of R with them.

Multi-party signing: it is also plausible that the transactions detailed in this section may include more signatures, from multiple different parties, to aid in Alice's attestation of the PUF identity. For example, it may desirable for both Alice and a third-party identity provider to sign the input(s) of the CRP transactions as a method to improve the trust of a verifier in Alice's identity. This is particularly relevant if the counter-signer is certificate authority that can attest to Alice's public key(s) used for signing blockchain transactions. Multiple parties may be included the signing process for example by means of threshold signatures or key-splitting techniques (e.g. Shamir Secret Sharing), as an alternative to just multiple signatures (i.e. 'multi-sig').

5.2. Efficient Identity-Management Using Transactions

An additional way in which a blockchain may be used in conjunction with PUF-based identity systems, such as those presented previously, is as an efficient means to revoke an identity key or token secured by a PUF device.

In prior work done on digital certificate management, it is known to issue and revoke certificates on-chain, and a corresponding certificate verification process accompanies this.

Consider a scenario whereby Alice is happy to cooperate with a certificate authority when attesting to her PUF-based identity on-chain. The process for Alice to register a certificate for her identity on-chain is as follows:

1. The certificate authority (CA) verifies the identity of Alice.
2. The CA creates the certificate transaction. This transaction has the following inputs and outputs:
    a. Input: CA's UTXO with an unlocking script containing CA's signature and public key.
    b. Output 1: a P2PKH locking script.
    c. Output 2: an OP_RETURN output containing Alice's public key.
3. The transaction is broadcast, and once it is mined, the CA provides Alice with the transaction ID $TXID_{CTX\text{-}PK_A}$.

This process culminates in Alice and the certificate authority cooperating to produce a transaction which signed by the CA, contains one unspendable output including a certificate on Alice's public key, and a spendable output paired to the certificate that the CA can use to revoke the certificate.

Embodiments disclosed herein use a hybrid of the method outlined for the digital certificates above and a method of establishing PUF-based identity, such as one of the methods described earlier. An element added to the PUF identity system here is for the generic trusted third-party (analogous to the CA), to be able to 'revoke' a CRP, or a related public key, by spending a UTXO.

The case where the trusted third-party revokes a certificate on Alice's public key relates to the cryptographic identity establishment discussed earlier.

In the case of CR-pairs (CRPs) stored or attested to on chain, embodiments disclosed herein provide a scheme that allows for the trusted third-party to revoke CRPs once they are used in an authentication process. An example method is as follows:

1. Alice and the trusted third-party conduct an identity setup protocol (e.g. as described earlier).
2. Alice and the trusted third-party now wish to use the blockchain for management of the CRPs generated in 1, or that are now obtainable after step 1:
   a. Alice creates a CRP mapping transaction $\text{TxID}_{CRP\text{-}Set}$ which maps the CRPs to transaction outputs. This is shown in Table 4 below.
   b. Alice and the trusted third-party both sign $\text{TxID}_{CRP\text{-}Set}$
3. The CRP mapping transaction $\text{TxID}_{CRP\text{-}Set}$ is broadcast and published in a blockchain block.

TABLE 4 a CRP mapping transaction allowing CRP revocation/consumption by the trusted third-party $\text{TxID}_{CRP\text{-}Set}$

| Input | | Output | |
|---|---|---|---|
| Outpoint | Script | Value | Script |
| $\text{TxID}_{Prev}$ | $< \text{SIG}_A > < \text{P}_A >$ $< \text{SIG}_{TTP} >$ $< \text{P}_{TTP} >$ | x BSV | [Checksig $\text{P}_{TTP}$] OP_RETURN $<\text{Rep}(C_1, R_1)>$ |
| | | x BSV | [Checksig $\text{P}_{TTP}$ ] OP_RETURN $<\text{Rep}(C_2, R_2)>$ |
| | | x BSV | [Checksig $\text{P}_{TTP}$] OP_RETURN $<\text{Rep}(C_3, R_3)>$ |
| | | ... | |
| | | x BSV | [Checksig $\text{P}_{TTP}$ ] OP_RETURN $<\text{Rep}(C_n, R_n)>$ |

The mapping transaction created in this process is shown in Table 4 above. This is very similar to the CRP mapping transaction shown previously in Table 2, with a difference that both the trusted third party and Alice sign the input, and that each of the UTXOs mapped to the CRPs can be revoked by the trusted third-party by spending in a future transaction.

This is advantageous as it allows for the revocation of CRPs to be handled without direct communication, and the TTP may perform revocation on the user's behalf, which further reduces the burden on Alice in the system and allows her identity management to become even more lightweight.

6. CONCLUSION

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 104. However it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 104 may be replaced with reference to a blockchain network 106, blockchain 150 and blockchain node 104 respectively. The blockchain, blockchain network and/or blockchain nodes may share some or all of the described properties of the bitcoin blockchain 150, bitcoin network 106 and bitcoin nodes 104 as described above.

In preferred embodiments of the invention, the blockchain network 106 is the bitcoin network and bitcoin nodes 104 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 106).

In other embodiments of the invention, the blockchain network 106 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 104 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 104.

It will be appreciated that the above embodiments have been described by way of example only. More generally there may be provided a method, apparatus or program in accordance with any one or more of the following Statements.

Statement 1. A computer-implemented method for enabling one or more verifying parties to verify an identity of a target comprising a target party or device of the target party; the method comprising, in a set-up phase:

storing, in a data store, a respective piece of response data for each of a set of one or more responses resulting from a setting-up party inputting a respective set of one or more challenges into a PUF module comprising a physically unclonable function, PUF, to generate the one or more responses based on the PUF; and storing an indication of the set of challenges in the data store, wherein the indication does not comprise a value of each of the challenges in the set, but rather a master challenge from which the set of challenges is derivable by applying a derivation function to the master challenge;

thereby making at least one of the pieces of response data and the respective challenge available to the one or more verifying parties for verifying the identity of the target in a subsequent verification phase, wherein the respective piece of response data for each response comprises the respective response or data derived therefrom.

Statement 2. The method of Statement 1, wherein the data store is implemented in third party computer equipment.

Statement 3. The method of Statement 1 or 2, wherein the method is performed by a trusted third party.

Statement 4. The method of Statement 3 as dependent on Statement 2, wherein the third party computer equipment is computer equipment of the trusted third party.

Statement 5. The method of Statement 3 or 4, wherein the setting-up party is the target party, the method comprising receiving the set of responses or pieces of response data from the target party, and the storing comprising storing the pieces of response data in the data store based on the receiving from the target party.

Statement 6. The method of Statement 5, comprising an initial step of generating and sending the set of challenges or master challenge to the target party to enable the target party to generate the set of responses.

Statement 7. The method of Statement 5, wherein the set of challenges is generated by the target party and the method comprises receiving the set of challenges or the master challenge from the target party in order to store the master challenge in the data store.

Statement 8. The method of Statement 2 or any subsequent Statement as dependent thereon, wherein the setting-up party is the target party, and the method is performed by the target party, the target party performing said storing of the pieces of response data and master challenge by submitting the set of responses or pieces of response data, and the master challenge, to the third party computer equipment.

Statement 9. The method of Statement 7 or 8, comprising establishing a secure channel between the target party and trusted third party based on a shared secret shared between the target party and trusted third party, wherein the receiving or submitting of the master challenge or set of challenges between the target party and trusted third party is performed over the secure channel.

Statement 10. The method of Statement 9, wherein said submitting comprises sending the set of responses or pieces of response data to the third party system over a network.

Statement 11. The method of Statement 3 or any subsequent claim as dependent thereon, wherein the setting-up party is the trusted third party who performs the set-up on behalf of the target party, then sends the PUF module to the target party to enable the target party to respond to challenges from the one or more verifying parties.

Statement 12. The method of Statement 1 or 2, wherein the data store is a public peer-to-peer publication medium.

Statement 13. The method of Statement 12, wherein the peer-to-peer publication medium is a blockchain.

Statement 14. The method of any preceding Statement, wherein the master challenge comprises identification data comprising, or derived from, one or more pieces of identification information relating to the identity of the target.

Statement 15. The method of Statement 14, wherein the identification data comprises, or is generated from, a combination of a plurality of pieces of identification information of the target party.

Statement 16. The method of Statement 14 or 15, wherein the method is performed by a trusted third party, and comprises determining the master challenge data based on obtaining the one or more pieces of identification information.

Statement 17. The method of Statement 16, wherein said obtaining comprises receiving the one or more pieces of identification information from the target party.

Statement 18. The method of Statement 14 or 15, wherein the method is performed by the target party, and the storing of the master challenge comprises the target party performing one of: determining the master challenge and sending it to be stored in the data store, or sending at least one of the one or more pieces of identification information to a trusted third party to cause the trusted third party to generate the master challenge and it store in the data store.

Statement 19. The method of Statement 17 or 18, comprising establishing a secure channel between the target party and trusted third party based on a shared secret shared between the target party and trusted third party, wherein the receiving or sending of the identification information between the target party and trusted third party is performed over the secure channel.

Statement 20. The method of any preceding Statement, wherein the target is one of multiple targets for which the data store stores corresponding sets of response data and master challenges, each master challenge enabling derivation of a respective set of challenges, for use in verifying the corresponding target.

Statement 21. The method of Statement 20, wherein each master challenge comprises identification data of the corresponding target.

Statement 22. The method of any preceding Statement, wherein the derivation function derives the set of challenges in an ordered form, and each of the pieces of response data is stored in association with an identifier specifying a different one of the challenges in said order, thus mapping different respective pieces of response data to different respective ones of the set of challenges derivable from the master challenge.

Statement 23. The method of any preceding Statement, wherein the challenges of the set are derivable in a chained manner, a first of the set of challenges being derivable by applying the derivation function to the master challenge, and each successive challenge in said set being derivable by applying the derivation function to a preceding challenge in the set.

Statement 24. The method of any of Statements 1 to 22, wherein the challenges of the set are derivable in a hierarchical manner, a first subset of the set of challenges being derivable by applying the derivation function to the master challenge, and each of one or more successive subsets being derivable by applying the derivation function to one of the challenges further back in the hierarchy.

Statement 25. The method of any preceding Statement, wherein the derivation function or an indication thereof is also stored in the data store, thereby making the derivation function or indication thereof available to the one or more verifying parties.

Statement 26. The method of any preceding Statement, wherein the derivation function is pre-known to at least one of the verifying parties and does not need to be made available or indicated to the at least one verifying party.

Statement 27. The method of any preceding Statement, wherein the one or more verifying parties are a plurality of verifying parties.

Statement 28. The method of any preceding Statement, wherein the set of challenges is a plurality of challenges, and the set of responses is respective plurality of responses.

Statement 29. The method of Statement 28, wherein the storing makes only a respective subset of one or more of the pieces of response data available to each of the verifying parties, with different subsets being made available to different ones of the verifying parties.

Statement 30. The method of Statement 29, wherein the subsets are exclusive of one another.

Statement 31. The method of any preceding Statement, wherein each of the response data records comprises an explicit value of the respective response.

Statement 32. The method of Statement 31, wherein the values of the response data records are stored in the data store only in encrypted form.

Statement 33. The method of Statement 32, wherein each of a plurality of subsets of one or more of the response data records is individually encrypted, each subset requiring a different respective decryption key to decrypt.

Statement 34. The method of Statement 33 as dependent on at least Statement 29, wherein the different subsets are made available to different ones of the verifying parties by distributing different ones of the decryption keys to different verifying parties.

Statement 35. The method of any of Statement 1 to 30, wherein each of the pieces of response data comprises only an attestation of the respective response, not an explicit value of the response, the attestation comprising a transformation of the respective response which does not disclose the response, but which enables a verifying party to verify the identity of the target by performing the same transformation on a further instance of the respective response returned by the target and comparing with the attestation.

Statement 36. The method of Statement 35, wherein the transformation comprises a hash or double hash.

Statement 37. The method of any preceding Statement, wherein the PUF module comprises a PUF, interface logic, and a deterministic transform function; wherein the interface logic causes the generation of the set of responses by: receiving the set of challenges; inputting a base challenge into the PUF to generate a corresponding primary response; and inputting each of the received set of challenges and into the transform function in conjunction with the generated base response in order to generate the respective response of said set of responses, the transform function being a function of the respective challenge from the received set and the generated base response.

Statement 38. Computer equipment comprising: memory comprising one or more memory units; and processing apparatus comprising one or more processing units, wherein the memory stores code arranged to run on the processing apparatus, the code being configured so as when on the processing apparatus to perform the method of any preceding Statement.

Statement 39. A computer program embodied on a non-transitory computer-readable medium and configured so as, when run on one or more processors, to perform the method of any of Statement 1 to 37.

Statement 40. A computer-implemented method whereby a verifying party verifies an identity of a target comprising a target party or device of the target party; the method comprising, by the verifying party: accessing, from a data store, a piece of response data from among a set of response data records, each comprising either: a) a value of a response resulting from inputting a challenge into a PUF module comprising a physically unclonable function, PUF, associated with the target, or b) an attestation comprising a transformation of the response; accessing a master challenge from the data store, and deriving at least one of the set of challenges by applying a derivation function to the master challenge; sending to the target a request comprising the at least one challenge to the target, and in response receiving back a further instance of the response; performing a comparison and verifying the identity of the target on condition that the comparison results in a match, wherein the comparison comprises: in the case of a) the stored value of the response matches the further instance, or in the case of b) the attestation matches the same transformation applied to the further instance.

Statement 41. The method of Statement 40, wherein the applying of the derivation function comprises applying the derivation function at computer equipment of the verifying party.

Statement 42. The method of Statement 40, wherein the data store is implemented at third party computer equipment, and the applying of the derivation function comprises the verifying party requesting the derivation function to be applied at the third party computer equipment.

Statement 43. Computer equipment comprising: memory comprising one or more memory units; and processing apparatus comprising one or more processing units, wherein the memory stores code arranged to run on the processing apparatus, the code being configured so as when on the processing apparatus to perform the method of Statement 40, 41 or 42.

Statement 44. A computer program embodied on a non-transitory computer-readable medium and configured so as, when run on one or more processors, to perform the method of Statement 40, 41 or 42.

The invention claimed is:

1. A computer-implemented method for enabling one or more verifying parties to verify an identity of a target comprising a target party or a device of the target party; the method comprising, in a set-up phase:

storing, in a data store, a respective piece of response data for each of a set of one or more responses resulting from a setting-up party inputting a respective set of one or more challenges into a PUF module comprising a physically unclonable function, PUF, to generate the one or more responses based on the PUF, wherein the respective piece of response data for each response comprises the respective response or data derived therefrom; and storing an indication of the set of challenges in the data store, wherein the indication does not comprise a value of each of the challenges in the set, but rather instead, the stored indication comprises a master challenge from which the set of challenges is derivable by applying a derivation function to the master challenge, wherein the master challenge is stored in the data store in lieu of explicitly storing a respective challenge for every response in the set of one or more responses;

making the master challenge and at least one of the pieces of response data available to the one or more verifying parties from the data store, thereby enabling the one or more verifying parties to derive the respective challenge from the master challenge using the derivation function, for the one or more verifying parties to verify the identity of the target in a subsequent verification phase.

2. The method of claim 1, wherein the data store is implemented in third party computer equipment.

3. The method of claim 1, wherein the data store is a public peer-to-peer publication medium, wherein the peer-to-peer publication medium is a blockchain.

4. The method of claim 1, wherein the master challenge comprises identification data comprising, or derived from, one or more pieces of identification information relating to the identity of the target.

5. The method of claim 4, wherein the identification data comprises, or is generated from, a combination of a plurality of pieces of identification information of the target party.

6. The method of claim 4, wherein the method is performed by a trusted third party, and comprises determining the master challenge based on obtaining the one or more pieces of identification information.

7. The method of claim 6, wherein said obtaining comprises receiving the one or more pieces of identification information from the target party.

8. The method of claim 7, comprising establishing a secure channel between the target party and the trusted third party based on a shared secret shared between the target party and trusted third party, wherein the receiving or sending of the identification information between the target party and trusted third party is performed over the secure channel.

9. The method of claim 4, wherein the method is performed by the target party, and the storing of the master challenge comprises the target party performing one of: determining the master challenge and sending it to be stored in the data store, or sending at least one of the one or more pieces of identification information to a trusted third party to cause the trusted third party to generate the master challenge and store it in the data store.

10. The method of claim 1, wherein the target is one of multiple targets for which the data store stores corresponding sets of response data and master challenges, each master challenge enabling derivation of a respective set of challenges, for use in verifying the corresponding target.

11. The method of claim 10, wherein each master challenge comprises identification data of the corresponding target.

12. The method of claim 1, wherein the derivation function derives the set of challenges in an ordered form, and each of the pieces of response data is stored in association with an identifier specifying a different one of the challenges in said order, thus mapping different respective pieces of response data to different respective ones of the set of challenges derivable from the master challenge.

13. The method of claim 1, wherein the challenges of the set are derivable in a chained manner, a first of the set of challenges being derivable by applying the derivation function to the master challenge, and each successive challenge in said set being derivable by applying the derivation function to a preceding challenge in the set.

14. The method of claim 1, wherein the challenges of the set are derivable in a hierarchical manner, a first subset of the set of challenges being derivable by applying the derivation function to the master challenge, and each of one or more successive subsets being derivable by applying the derivation function to one of the challenges further back in the hierarchy.

15. The method of claim 1, wherein the derivation function or an indication thereof is also stored in the data store, thereby making the derivation function or indication thereof available to the one or more verifying parties.

16. The method of claim 1, wherein the derivation function is pre-known to at least one of the verifying parties and does not need to be made available or indicated to the at least one verifying party.

17. The method of claim 1, wherein:

the one or more verifying parties are a plurality of verifying parties;

the set of challenges is a plurality of challenges, and the set of responses is a respective plurality of responses; and the storing makes only a respective subset of one or more of the pieces of response data available to each of the verifying parties, with different subsets being made available to different ones of the verifying parties.

18. The method of claim 17, wherein the subsets are exclusive of one another.

19. The method of claim 1, wherein each of the response data comprises an explicit value of the respective response but are stored in the data store only in encrypted form.

20. The method of claim 19, wherein:

each of a plurality of subsets of one or more of response data records is individually encrypted, each subset requiring a different respective decryption key to decrypt; and the different subsets are made available to different ones of the verifying parties by distributing different ones of the decryption keys to different verifying parties.

21. The method of claim 1, wherein each of the pieces of response data comprises only an attestation of the respective response, not an explicit value of the response, the attestation comprising a transformation of the respective response which does not disclose the response, but which enables a verifying party to verify the identity of the target by performing the same transformation on a further instance of the respective response returned by the target and comparing with the attestation.

22. The method of claim 21, wherein the transformation comprises a hash or double hash.

23. Computer equipment comprising: memory comprising one or more memory units; and a processing apparatus comprising one or more processing units, wherein the memory stores code arranged to run on the processing apparatus, the code being configured so as when run on the processing apparatus, the processing apparatus performs a method of enabling one or more verifying parties to verify an identity of a target comprising a target party or a device of the target party; the method comprising, in a set-up phase:

storing, in a data store, a respective piece of response data for each of a set of one or more responses resulting from a setting-up party inputting a respective set of one or more challenges into a physically undonable function (PUF) module comprising a PUF, to generate the one or more responses based on the PUF, wherein the respective piece of response data for each response comprises the respective response or data derived therefrom; and storing an indication of the set of challenges in the data store, wherein the indication does not comprise a value of each of the challenges in the set, but rather instead, the indication comprises a master challenge from which the set of challenges is derivable by applying a derivation function to the master challenge, wherein the master challenge is stored in the data store in lieu of explicitly storing a respective challenge for every response in the set of one or more responses;

wherein the data store is arranged to make the master challenge and at least one of the pieces of response data available to the one or more verifying parties, thereby enabling the one or more verifying parties to derive the respective challenge from the master challenge using the derivation function, for the one or more verifying parties to verify the identity of the target in a subsequent verification phase.

24. A computer program product embodied on a non-transitory computer-readable medium and configured so as, when run on one or more processors, the one or more processors perform a method of enabling one or more verifying parties to verify an identity of a target comprising a target party or a device of the target party; the method comprising, in a set-up phase:

storing, in a data store, a respective piece of response data for each of a set of one or more responses resulting from a setting-up party inputting a respective set of one or more challenges into a physically unclonable function (PUF) module comprising a physically unclonable function, PUF, to generate the one or more responses based on the PUF, wherein the respective piece of response data for each response comprises the respective response or data derived therefrom; and storing an indication of the set of challenges in the data store, wherein the indication does not comprise a value of each of the challenges in the set, but rather instead, the indication comprises a master challenge from which the set of challenges is derivable by applying a derivation function to the master challenge, wherein the master challenge is stored in the data store in lieu of explicitly storing a respective challenge for every response in the set of one or more responses;

wherein the data store makes the master challenge and at least one of the pieces of response data available to the one or more verifying parties, thereby enabling the one or more verifying parties to derive the respective challenge from the master challenge using the derivation function, for the one or more verifying parties to verify the identity of the target in a subsequent verification phase.

25. A computer-implemented method whereby a verifying party verifies an identity of a target comprising a target party or a device of the target party; the method comprising, by the verifying party:

accessing a data store that stores a set of response data records, each response data record comprising a respective piece of response data that comprises either: a) a value of a response resulting from inputting a respective challenge into a PUF module comprising a physically unclonable function (PUF) associated with the target, or b) an attestation comprising a transformation of the response, wherein the accessing of the data store comprises accessing one of the pieces of response data from the data store;

accessing a master challenge from the data store, and deriving the respective challenge of at least one of said set of response data records by applying a derivation function to the master challenge, wherein the master challenge is stored in the data store in lieu of explicitly storing a respective challenge for every response in the set of response data records;

sending to the target a request comprising the respective challenge to the target, and in response receiving back a further instance of the response;

performing a comparison and verifying the identity of the target on condition that the comparison results in a match, wherein the comparison comprises:

in the case of a) the stored value of the response matches the further instance, or in the case of b) the attestation matches the transformation applied to the further instance.

\* \* \* \* \*